US011948281B2

(12) United States Patent
Lin et al.

(10) Patent No.: US 11,948,281 B2
(45) Date of Patent: Apr. 2, 2024

(54) GUIDED UP-SAMPLING FOR IMAGE INPAINTING

(71) Applicant: ADOBE INC., San Jose, CA (US)

(72) Inventors: Zhe Lin, Fremont, CA (US); Yu Zeng, Liaoning (CN); Jimei Yang, Mountain View, CA (US); Jianming Zhang, Campbell, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 16/864,388

(22) Filed: May 1, 2020

(65) Prior Publication Data

US 2021/0342984 A1    Nov. 4, 2021

(51) Int. Cl.
*G06T 5/00*       (2006.01)
*G06T 3/40*       (2006.01)
*G06T 3/4046*     (2024.01)
*G06T 3/4076*     (2024.01)

(52) U.S. Cl.
CPC ............ *G06T 5/005* (2013.01); *G06T 3/4046* (2013.01); *G06T 3/4076* (2013.01)

(58) Field of Classification Search
None
See application file for complete search history.

(56) References Cited

U.S. PATENT DOCUMENTS

| | | | |
|---|---|---|---|
| 2009/0033737 A1* | 2/2009 | Goose | H04N 7/15 348/E7.083 |
| 2017/0032563 A1* | 2/2017 | Distler | G06T 17/20 |
| 2018/0075581 A1* | 3/2018 | Shi | G06T 3/4046 |
| 2018/0096454 A1* | 4/2018 | Amirghodsi | G06T 7/73 |
| 2019/0355102 A1* | 11/2019 | Lin | G06V 10/82 |
| 2021/0125313 A1* | 4/2021 | Bai | G06V 10/454 |
| 2021/0150678 A1* | 5/2021 | Yi | G06N 3/0481 |

OTHER PUBLICATIONS

Zeng, Y., Lin, Z., Yang, J., Zhang, J., Shechtman, E., & Lu, H. (2020). High-Resolution Image Inpainting with Iterative Confidence Feedback and Guided Upsampling. arXiv preprint arXiv:2005. 11742.

(Continued)

*Primary Examiner* — Aaron M Richer
(74) *Attorney, Agent, or Firm* — Shook, Hardy & Bacon L.L.P.

(57) ABSTRACT

Methods and systems are provided for accurately filling holes, regions, and/or portions of high-resolution images using guided upsampling during image inpainting. For instance, an image inpainting system can apply guided upsampling to an inpainted image result to enable generation of a high-resolution inpainting result from a lower-resolution image that has undergone inpainting. To allow for guided upsampling during image inpainting, one or more neural networks can be used. For instance, a low-resolution result neural network (e.g., comprised of an encoder and a decoder) and a high-resolution input neural network (e.g., comprised of an encoder and a decoder). The image inpainting system can use such networks to generate a high-resolution inpainting image result that fills the hole, region, and/or portion of the image.

18 Claims, 13 Drawing Sheets

(56) References Cited

OTHER PUBLICATIONS

Ballester, C., Bertalmio, M., Caselles, V., Sapiro, G., & Verdera, J. (2001). Filling-in by joint interpolation of vector fields and gray levels. IEEE transactions on image processing, 10(8), 1200-1211.
Bertalmio, M., Sapiro, G., Caselles, V., & Ballester, C. (2000, July). Image inpainting. In Proceedings of the 27th annual conference on Computer graphics and interactive techniques (pp. 417-424).
Efros, A. A., & Freeman, W. T. (Aug. 2001). Image quilting for texture synthesis and transfer. In Proceedings of the 28th annual conference on Computer graphics and interactive techniques (pp. 341-346).
Kwatra, V., Essa, I., Bobick, A., & Kwatra, N. (2005). Texture optimization for example-based synthesis. In ACM SIGGRAPH 2005 Papers (pp. 795-802).
Barnes, C., Shechtman, E., Finkelstein, A., & Goldman, D. B. (2009). PatchMatch: A randomized correspondence algorithm for structural image editing. ACM Trans. Graph., 28(3), 24.
Drori, I., Cohen-Or, D., & Yeshurun, H. (2003). Fragment-based image completion. In ACM SIGGRAPH 2003 Papers (pp. 303-312).
Goodfellow, I., Pouget-Abadie, J., Mirza, M., Xu, B., Warde-Farley, D., Ozair, S., . . . & Bengio, Y. (2014). Generative adversarial nets. In Advances in neural information processing systems (pp. 2672-2680).
Pathak, D., Krahenbuhl, P., Donahue, J., Darrell, T., & Efros, A. A. (2016). Context encoders: Feature learning by inpainting. In Proceedings of the IEEE conference on computer vision and pattern recognition (pp. 2536-2544).
Iizuka, S., Simo-Serra, E., & Ishikawa, H. (2017). Globally and locally consistent image completion. ACM Transactions on Graphics (ToG), 36(4), 1-14.
Yu, J., Lin, Z., Yang, J., Shen, X., Lu, X., & Huang, T. S. (2018). Generative image inpainting with contextual attention. In Proceedings of the IEEE conference on computer vision and pattern recognition (pp. 5505-5514).
Zeng, Y., Fu, J., Chao, H., & Guo, B. (2019). Learning pyramid-context encoder network for high-quality image inpainting. In Proceedings of the IEEE conference on computer vision and pattern recognition (pp. 1486-1494).
Yang, C., Lu, X., Lin, Z., Shechtman, E., Wang, O., & Li, H. (2017). High-resolution image inpainting using multi-scale neural patch synthesis. In Proceedings of the IEEE Conference on Computer Vision and Pattern Recognition (pp. 6721-6729).
Liu, G., Reda, F. A., Shih, K. J., Wang, T. C., Tao, A., & Catanzaro, B. (2018). Image inpainting for irregular holes using partial convolutions. In Proceedings of the European Conference on Computer Vision (ECCV) (pp. 85-100).

Yu, J., Lin, Z., Yang, J., Shen, X., Lu, X., & Huang, T. S. (2019). Free-form image inpainting with gated convolution. In Proceedings of the IEEE International Conference on Computer Vision (pp. 4471-4480).
Oh, S. W., Lee, S., Lee, J. Y., & Kim, S. J. (2019). Onion-peel networks for deep video completion. In Proceedings of the IEEE International Conference on Computer Vision (pp. 4403-4412).
Guo, Z., Chen, Z., Yu, T., Chen, J., & Liu, S. (Oct. 2019). Progressive image inpainting with full-resolution residual network. In Proceedings of the 27th ACM International Conference on Multimedia (pp. 2496-2504).
Zhang, H., Hu, Z., Luo, C., Zuo, W., & Wang, M. (Oct. 2018). Semantic image inpainting with progressive generative networks. In Proceedings of the 26th ACM international conference on Multimedia (pp. 1939-1947).
Caelles, S., Pont-Tuset, J., Perazzi, F., Montes, A., Maninis, K. K., & Van Gool, L. (2019). The 2019 davis challenge on vos: Unsupervised multi-object segmentation. arXiv preprint arXiv:1905.00737.
Everingham, M., Van Gool, L., Williams, C. K., Winn, J., & Zisserman, A. (2010). The pascal visual object classes (voc) challenge. International journal of computer vision, 88(2), 303-338.
Fan, D. P., Cheng, M. M., Liu, J. J., Gao, S. H., Hou, Q., & Borji, A. (2018). Salient objects in clutter: Bringing salient object detection to the foreground. In Proceedings of the European conference on computer vision (ECCV) (pp. 186-202).
Isola, P., Zhu, J. Y., Zhou, T., & Efros, A. A. (2017). Image-to-image translation with conditional adversarial networks. In Proceedings of the IEEE conference on computer vision and pattern recognition (pp. 1125-1134).
Li, G., & Yu, Y. (2016). Deep contrast learning for salient object detection. In Proceedings of the IEEE Conference on Computer Vision and Pattern Recognition (pp. 478-487).
Liang, X., Liu, S., Shen, X., Yang, J., Liu, L., Dong, J., . . . & Yan, S. (2015). Deep human parsing with active template regression. IEEE transactions on pattern analysis and machine intelligence, 37(12), 2402-2414.
Nazeri, K., Ng, E., Joseph, T., Qureshi, F. Z., & Ebrahimi, M. (2019). Edgeconnect: Generative image inpainting with adversarial edge learning. arXiv preprint arXiv:1901.00212.
Jiang, H., Wang, J., Yuan, Z., Wu, Y., Zheng, N., & Li, S. (2013). Salient object detection: A discriminative regional feature integration approach. In Proceedings of the IEEE conference on computer vision and pattern recognition (pp. 2083-2090).
Xiong, W., Yu, J., Lin, Z., Yang, J., Lu, X., Barnes, C., & Luo, J. (2019). Foreground-aware image inpainting. In Proceedings of the IEEE conference on computer vision and pattern recognition (pp. 5840-5848).

\* cited by examiner

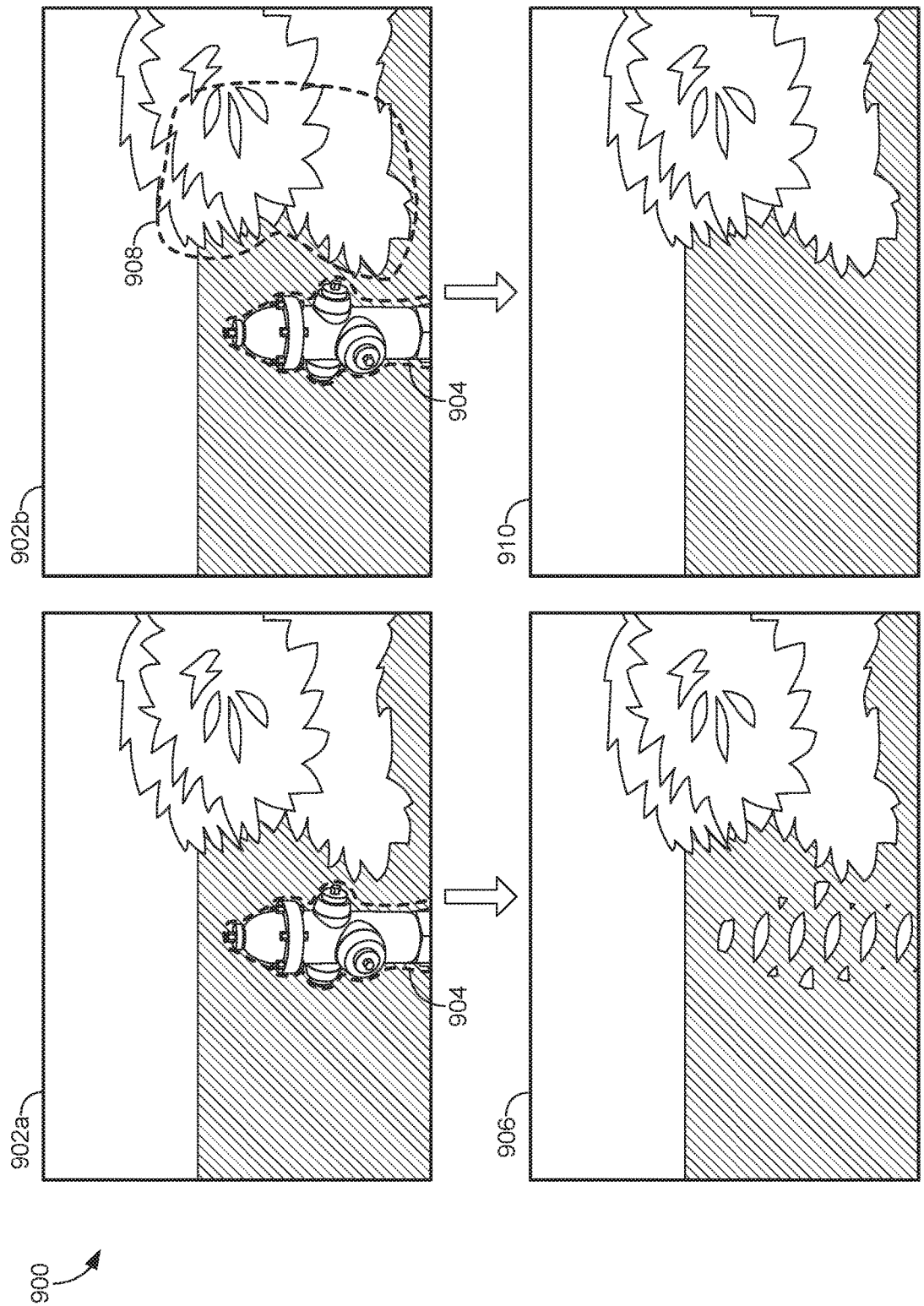

GUIDED UP-SAMPLING FOR IMAGE INPAINTING

BACKGROUND

In an imaging environment, such as an imaging or a photograph editing application (e.g., Adobe® Photoshop®), image inpainting is a task of reconstructing regions in an image. For instance, in some cases, certain images are incomplete and result in portions of the image that are unclear, missing, and/or otherwise lack information. By way of example, images received over a network or captured via a camera may degrade and lack information for all pixels of the image resulting in unclear, blurry and/or other incomplete pixels in images. These images include a number of undefined pixels where information for those respective pixels is not known (e.g., a hole) and a number of defined pixels where information for those respective pixels is known.

SUMMARY

Embodiments of the present disclosure are directed towards an image inpainting system that can apply guided upsampling to an inpainted image result to enable generation of a high-resolution inpainting result from a lower-resolution image that has undergone inpainting. In accordance with embodiments of the present disclosure, the image inpainting system uses a guided upsampling by borrowing known high-resolution feature patches from the high-resolution input image based on patch similarities computed using the low-resolution inpainting result (e.g., the inpainting result for the down-sampled version of the high-resolution input image). In particular, a patch similarity analysis can be performed on the low-resolution inpainting result. This similarity analysis can analyze features of patches (e.g., feature patches) within the designated portion of the low-resolution inpainting result (e.g., generated feature patches) in comparison with feature patches outside of the designated portion of the low-resolution inpainting result (e.g., valid feature patches). From this similarity analysis, similar valid feature patches outside of the designated portion can be identified for a generated feature patch within the designated portion of the low-resolution inpainting result. Identifying such similar valid feature patches from the low-resolution image result can be used during the upsampling of the low-resolution inpainting result to ensure that pixel information synthesized in a high-resolution inpainting result remains semantically plausible and visually realistic.

To create such an image inpainting system, one or more neural networks can be used. For instance, the image inpainting system can implement one or more neural networks based on a generative adversarial network architecture (e.g., comprised of a generator and a discriminator). For instance, the generator can be comprised of a low-resolution result neural network (e.g., comprised of an encoder and a decoder) and a high-resolution input neural network (e.g., comprised of an encoder and a decoder). The image inpainting system can use a low-resolution result neural network to analyze feature patches of a low-resolution inpainting result for similarity. The high-resolution input neural network can then be used map information from most similar valid feature patches identified in the low-resolution image result to corresponding feature patches in a high-resolution image. In particular, the high-resolution input neural network can perform image reconstruction by replacing feature patches within a designated portion of the high-resolution image using corresponding high-resolution feature patches. Applying information based on these corresponding high-resolution feature patches can help a high-resolution input neural network maintain important feature information when upsampling a low-resolution image result to a high-resolution image result.

BRIEF DESCRIPTION OF THE SEVERAL VIEWS OF THE DRAWING

These and other features, aspects, and advantages of the present disclosure are better understood when the following Detailed Description is read with reference to the accompanying drawings.

FIGS. 9A-9B illustrate examples of enhanced image inpainting results using an image inpainting system to perform image enhancement using guided upsampling, in accordance with embodiments of the present disclosure.

DETAILED DESCRIPTION OF THE INVENTION

Figure 1A:
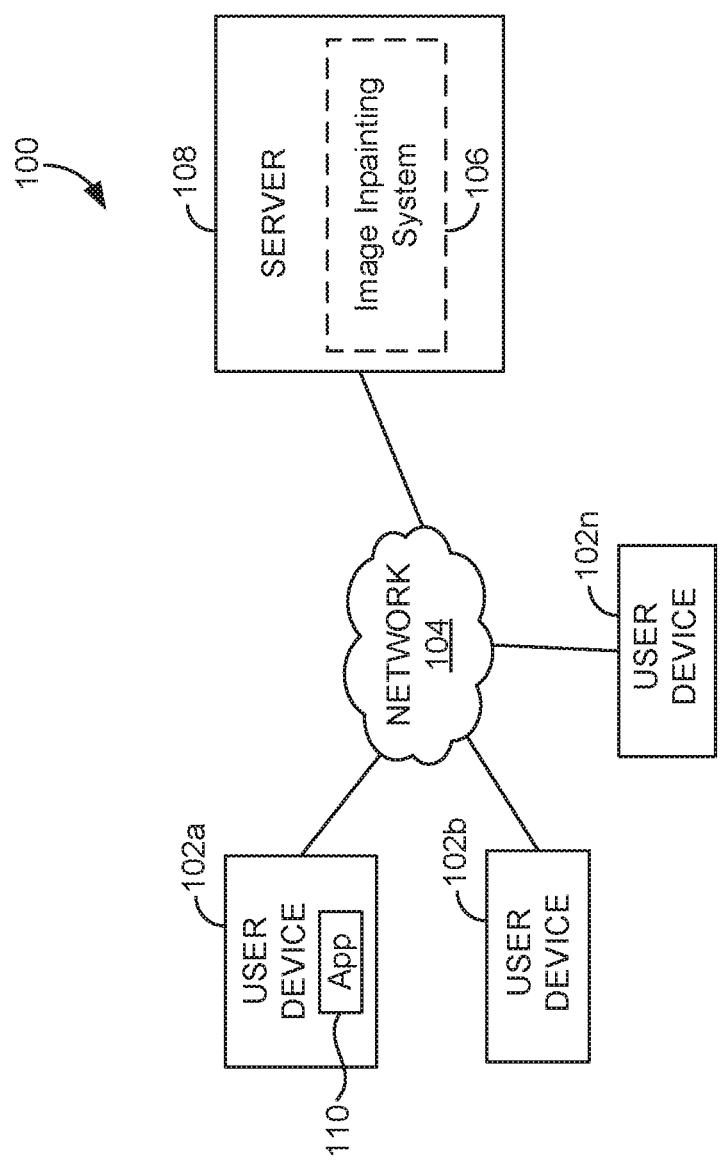
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms and phrases are used herein to describe embodiments of the present invention. Some of the terms and phrases used herein are described here, but more details are included throughout the description.

As used herein, the term "image inpainting" generally refers to a task of reconstructing regions in an image. For instance, image inpainting can be any technique used to determine information used for updating undefined pixels in an image. Such undefined pixels can relate to pixels of the image that are unclear, missing, and/or otherwise lack pixel information.

As used herein, the term "image inpainting system" refers to a system capable of performing image inpainting on high-resolution images using guided upsampling. In particular, the image inpainting system of the present disclosure is capable of not only performing inpainting (e.g., generating inpainting results), but can also enable the generation of an enhanced image (e.g., high-resolution image) from such inpainting results. The image inpainting system can comprise one or more networks based on a generative adversarial architecture. For instance, the image inpainting system can include a generator that having a low-resolution result neural network (e.g., comprised of an encoder and a decoder) and a high-resolution input neural network (e.g., comprised of an encoder and a decoder).

As used herein, the term "guided upsampling" generally refers to the generation of a high-resolution inpainting result from a lower-resolution image that has undergone inpainting. Such upsampling is guided by borrowing known high-resolution feature patches during upsampling to replace feature patches related to the inpainting process. In particular, a lower-resolution image can undergo guided upsampling to generate a high-resolution inpainting result. Such upsampling can increase the resolution of the low-resolution image result (e.g., upsample 256×256 to 512×512). Guided upsampling can be performed by borrowing known high-resolution feature patches from a high-resolution input image based on patch similarities computed using the low-resolution inpainting result (e.g., the inpainting result for a down-sampled version of the high-resolution input image).

As used herein, the term "low-resolution result neural network" refers to a neural network trained to analyze feature patches of a low-resolution inpainting result for similarity. Such a low-resolution result neural network can be comprised of an encoder and a decoder. The low-resolution result neural network can be part of a generator portion of the image inpainting system that comprises one or more networks based on a generative adversarial architecture.

As used herein, the term "high-resolution input image" refers to a high-resolution image input into an image inpainting system for image inpainting. This high-resolution image input can undergo guided upsampling during image inpainting to generate a high-resolution image result. In particular, the high-resolution input image can have a designated portion that indicates one or more areas of the image to fill using image inpainting. To perform the guided upsampling, the high-resolution image input can be downsampled into a low-resolution input image. This low-resolution input image can then undergo image inpainting to generate a low-resolution input result. This low-resolution input result can then be used to fill the designated portion of the high-resolution image input. This high-resolution image input can then be used to generate a high-resolution image result using processes discussed herein.

As used herein, the term "designated portion" refers to a portion of an image to fill using image inpainting. For instance, a designated portion can correspond to a hole to fill using image inpainting. This hole can be generated by removing pixels information for pixels in the designated portion. In this way, pixels in the designated portion can be filled using pixel information determined during image inpainting.

As used herein, the term "low-resolution image result" refers to a lower-resolution image that has undergone inpainting. Such a lower-resolution image can be a down-sampled version of a high-resolution image input into an image inpainting system. For instance, during image inpainting, pixels in a designated portion of the low-resolution image (e.g., the down-sampled version of the high-resolution image) that corresponds to the designated portion high-resolution input image can be filled using pixel information determined during image inpainting.

As used herein, the term "high-resolution input neural network" refers to one or more neural networks trained to upsample images. In particular, the high-resolution input neural network can map information from most similar valid feature patches identified in a low-resolution image result to corresponding feature patches in a high-resolution image. Such a high-resolution input neural network can be comprised of an encoder and a decoder. The high-resolution input neural network can be part of a generator portion of the image inpainting system that comprises one or more networks based on a generative adversarial architecture.

The term "feature patch" is used herein to refer a group of pixels having information. A feature patch can relate to a group of pixels in a feature layer of a neural network. Such pixel information can comprise a feature map indicative of textual information related to the group of pixels. This group of pixels can be any size. For example, 8×8 for the low-resolution inpainting result and 16×16 for the high-resolution input image. A "valid feature patch" can relate to a feature patch outside of a designated portion of a low-resolution inpainting result. In this way, a valid feature patch is not predicted using image inpainting. A "generated feature patch" can relate to a feature patch inside a designated portion of a low-resolution inpainting result. In this way, a generated feature patch is predicted using image inpainting. "Similar valid feature patches" can be identified using a similarity analysis that compares valid feature patches (e.g., not predicted using image inpainting) with generated feature patches (e.g., predicted using image inpainting). From this similarity analysis, similar valid feature patches outside of the designated portion can be identified for a generated feature patch within the designated portion of the low-resolution inpainting result. Identifying such similar valid feature patches from the low-resolution image result can be used during the upsampling of the low-resolution inpainting result to ensure that pixel information synthesized in a high-resolution inpainting result remains semantically plausible and visually realistic.

The term "similarity analysis" is used herein to refer to analyzing features of patches (e.g., feature patches) within a designated portion of a low-resolution inpainting result (e.g., generated feature patches) in comparison with feature patches outside of the designated portion of the low-resolution inpainting result (e.g., valid feature patches). From this similarity analysis, similar valid feature patches outside of the designated portion can be identified for a generated feature patch within the designated portion of the low-resolution inpainting result. Identifying such similar valid feature patches from the low-resolution image result can be used during the upsampling of the low-resolution inpainting result to ensure that pixel information synthesized in a high-resolution inpainting result remains semantically plausible and visually realistic.

The term "image reconstruction" is used herein to refer to replacing feature patches within a designated portion of a high-resolution image with corresponding high-resolution feature patches. These corresponding high-resolution feature patches are from outside the designated portion of the high-resolution image such that these feature patches are from a portion of the high-resolution image that did not undergo image inpainting. Applying information based on these corresponding high-resolution feature patches can help a high-resolution input neural network maintain important feature information when upsampling a low-resolution image result to a high-resolution image result. Such a reconstructed image can be run through two additional convolutional layers to generate a high-resolution image result. These two additional convolutional layers can be used to convert the feature map information of the reconstructed image into a RGB output image (e.g., high-resolution image result).

The term "user" is used herein to refer to a marketer, publisher, editor, author, or other person who employs the image inpainting system described herein. A user can select or input an image or picture for editing (e.g., remove stains, scratches, blurred regions, objects, etc.). In addition, a user can indicate a region or portion of an image for editing (e.g., using image inpainting). A user can further designate one or more areas to either avoid or specifically use when identifying similar feature patches.

In an imaging environment, such as an imaging or a photograph editing application (e.g., Adobe® Photoshop®), users often desire to fix images, or a region, or portion thereof. For example, a user might want to remove a person from an image or restore a degraded portion of an image. Conventional inpainting methods typically borrow example patches of pixels from known regions in an image and paste the known patches of pixels into regions with undefined pixels where information for those respective pixels is not known (e.g., holes). Such approaches that borrow and paste patches of pixels can typically handle efficiently performing inpainting for high-resolution images, however, oftentimes, such approaches fail to produce semantically reasonable results. In particular, borrowing and pasting these patches of pixels often results in an image where the edited region does not seamlessly match with the content of the surrounding area(s).

With the advancement of technology, various methods for image inpainting have shifted to deep learning techniques (e.g., based on neural networks). Such deep learning techniques have shown promise in filling holes in complex images. However, many methods that rely on deep learning techniques can lead to over-smooth results due to convolutional structure layers of the neural network losing image detail information. Other methods that use deep learning techniques have attempted to overcome this deficiency by matching and adapting patches to produce image details (e.g., similar to conventional inpainting methods). However, this method often requires the use of optimization based on content and texture in order to preserve image details in high-resolution images. This optimization process is computationally inefficient and time-consuming.

Accordingly, embodiments of the present disclosure are directed to an image inpainting system (e.g., an enhancement image inpainting system) capable of performing image inpainting on high-resolution images using guided upsampling. In embodiments, such guided upsampling can be performed as a post-processing method applied to enhance an inpainted image result (e.g., an image that has undergone inpainting). For example, applying guided upsampling to an inpainted image result enables generation of a high-resolution inpainting result from a lower-resolution image that has undergone inpainting. In particular, the image inpainting system of the present disclosure is capable of not only performing inpainting (e.g., generating inpainting results), but can also enable the generation of an enhanced image (e.g., high-resolution image) from such inpainting results.

Such an image inpainting system can begin by performing image inpainting on a down-sampled version of a high-resolution input image. For instance, the image inpainting system can receive a high-resolution input image for image inpainting. Such a high-resolution input image can have a designated portion that corresponds to a hole to fill using image inpainting. This hole can be generated by removing pixels information for pixels in the designated portion. In this way, pixels in the designated portion can be filled using pixel information determined during image inpainting. Performing inpainting on a low-resolution image, instead of a higher-resolution image, is advantageous because it is easier to train a neural network to generate semantically plausible results at such lower resolutions. Further, such a neural network is also better at preserving image details that can later be used at higher resolutions.

Thus, a high-resolution image can be downsampled to a low-resolution image for use in image inpainting. For instance, during image inpainting, pixels in a designated portion of the low-resolution image (e.g., the down-sampled version of the high-resolution image) that corresponds to the designated portion high-resolution input image can be filled using pixel information determined during image inpainting. Subsequently, upon obtaining an inpainting result on the down-sampled version of the high-resolution input image (e.g., a low-resolution inpainting result), this low-resolution inpainting result can then be upsampled to a higher resolution (e.g., the original high-resolution) using guided upsampling. As such, embodiments of the present disclosure decouple high-level understanding from low-level reconstruction to produce high-resolution image results that are both semantically plausible and visually realistic.

In more detail, guided upsampling can be performed by borrowing known high-resolution feature patches from the high-resolution input image based on patch similarities computed using the low-resolution inpainting result (e.g., the inpainting result for the down-sampled version of the high-resolution input image). In particular, a patch similarity analysis can be performed on the low-resolution inpainting result. This similarity analysis can analyze features of patches (e.g., feature patches) within the designated portion of the low-resolution inpainting result (e.g., generated feature patches) in comparison with feature patches outside of the designated portion of the low-resolution inpainting result (e.g., valid feature patches). A feature patch can generally relate to pixel information for to a group of pixels (e.g., 8×8 for the low-resolution inpainting result and 16×16 for the high-resolution input image). Such pixel information can comprise a feature map indicative of textural information related to the group of pixels. In this way, the similarity analysis can compare valid feature patches (e.g., not predicted using image inpainting) with generated feature patches (e.g., predicted using image inpainting). From this similarity analysis, similar valid feature patches outside of the designated portion can be identified for a generated feature patch within the designated portion of the low-resolution inpainting result. Identifying such similar valid feature patches from the low-resolution image result can be used during the upsampling of the low-resolution inpainting result to ensure that pixel information synthesized in a high-resolution inpainting result remains semantically plausible and visually realistic.

In particular, similar valid feature patches identified in the low-resolution inpainting result can be mapped to corresponding valid feature patches in the high-resolution input image. Such mapping can be performed by scaling the coordinates of the valid feature patches in the low-resolution inpainting result to coordinates of feature patches in the high-resolution image. These identified valid feature patches in the high-resolution input image can then be used during image reconstruction when upsampling the low-resolution inpainting result. In particular, pixel information taken from these valid high-resolution feature patches can be used to update the pixels within the designated portion of the high-resolution image during upsampling. The result of such guided upsampling can be a high-resolution image result with the designated portion filled using inpainting where the filled pixels high-resolution image result appear realistic and semantically plausible in relation to the initial high-resolution input image.

In more detail, embodiments of the present disclosure are directed to a guided upsampling image inpainting system based on a deep generative model. In particular, and as described herein, the image inpainting system can use a model trained to generate a high-resolution inpainting result using borrowed valid high-resolution feature patches. Advantageously, a low-resolution version of an image is used during image inpainting, which maintains semantically plausible results in the low-resolution image result generated using inpainting. Using the low-resolution inpainting result, the model can then be trained to upsample the inpainting result using identified valid feature patches from the high-resolution input image, thus preserving image details in the image at higher resolutions.

To perform guided upsampling, the image inpainting system can train and/or use machine learning models. In an embodiment, the image inpainting system can be implemented using one or more neural networks. A neural network generally refers to a computational approach using large clusters of connected neurons. For example, a neural network can be comprised of fully connected layers. Neural networks are self-learning and trained rather than explicitly programmed such that a generated output of a neural network reflects a desired result.

In embodiments, the image inpainting system can comprise one or more networks based on a generative adversarial architecture. For instance, the image inpainting system can be comprised of generator that comprises a low-resolution result neural network (e.g., comprised of an encoder and a decoder) and a high-resolution input neural network (e.g., comprised of an encoder and a decoder). In some embodiments, such as during training of the image inpainting system, the image inpainting system can further comprise an additional adversarial network used as a discriminator.

The image inpainting system can use a low-resolution result neural network to analyze feature patches of a low-resolution inpainting result for similarity. In particular, the low-resolution result neural network can be used to analyze feature patches of the low-resolution inpainting result. For instance, the low-resolution result neural network can calculate a level of similarity (e.g., using cosine similarity) between a generated feature patch (e.g., a patch within the designated portion of the low-resolution image result) and a valid feature patch (e.g., patch outside the designated portion of the low-resolution image result). In some embodiments, a valid feature patch can be a feature patch with at least one pixel outside of the designated portion of the low-resolution image result. Using this similarity analysis, the low-resolution result neural network can identify similar valid feature patches for each corresponding generated feature patch within the designated portion of the low-resolution image result.

In some embodiments, the image inpainting system can incorporate user control in the similarity analysis. In particular, a user can designate one or more areas to either avoid or specifically use when identifying similar feature patches. For example, a user can designate an area in an image (e.g., the high-resolution image input into the image inpainting system for image inpainting) that should be avoided (e.g., avoid area) during the similarity analysis. During the similarity analysis, any valid feature patches that include one or more pixels within the avoid area can be discarded during the similarity analysis. For instance, the low-resolution result neural network will not select a feature patch as the most similar feature patch if one or more pixels in the feature patch are from within the avoid area. As another example, a user can designate an area in an image (e.g., the high-resolution image input into the image inpainting system for image inpainting) that should be favored (e.g., encourage area) during the similarity analysis. During the similarity analysis, valid feature patches that include one or more pixels that are not within the encourage area can be discarded by the system during the similarity analysis. For instance, the low-resolution result neural network will not select a patch as the most similar patch if one or more pixels in the feature patch are not within the encourage area. A user can designate such an avoid or encourage area using a user action with the image (e.g., click, scribble, object selection, etc.). Based on the user action, an avoid area can be avoided during the similarity analysis and an encourage area can be favored during the similarity analysis.

The image inpainting system can be trained to incorporate identified similar high-resolution feature patches in reconstructing an image during upsampling. These identified similar high-resolution feature patches can be identified based on the similar valid feature patches identified for each corresponding generated feature patch within the designated portion of the low-resolution image result. For instance, a high-resolution input neural network can map information from the most similar feature patches identified in the low-resolution image result to corresponding feature patches in the high-resolution image. Such mapping can be performed by scaling the coordinates of the feature patches in the low-resolution image to the coordinates of feature patches in the high-resolution image. The high-resolution input neural network can then apply the corresponding high-resolution feature patches when decoding a high-resolution image result during upsampling. For example, in a second to last layer (e.g., feature layer) of the high-resolution input neural network, feature patches inside the designated portion of the high-resolution image can be constructed using information taken from a set of most similar high-resolution feature patches from outside the designated portion (e.g., identified based on the similar valid feature patches identified in the low-resolution image result using the low-resolution neural network).

To train the image inpainting system, an image can be received. In embodiments, the image can be a high-resolution image (e.g., 512×512). The received image can have a designated portion. The designated portion of the image can comprise one or more regions in the image having undefined pixels where information for those respective pixels is not known (e.g., holes). This image can then be downsampled to a lower resolution. For example, a 512×512 image can be downsampled to 256×256 image. Such downsampling can be performed using any number of downsampling techniques.

Image inpainting can be performed on the downsampled image to generate a downsampled image result (e.g., the downsampled image with the designated portion filled using inpainting). For instance, image inpainting can be performed on the designated portion of the downsampled image to determine pixels information to update the undefined pixels in the designated portion. Such image inpainting can be performed using any number of inpainting techniques. In some embodiments, the image inpainting system can perform the inpainting process. In other embodiments, another system can be used to perform the inpainting process.

A patch similarity analysis can then be performed on the downsampled image result. The patch similarity analysis can be performed using a low-resolution result neural network to analyze features of patches within the designated portion of the low-resolution image result in comparison with features of patches outside of the designated portion of the low-resolution image result. This designated portion can correspond to a hole that was filled using image inpainting. Using this similarity analysis, the low-resolution result neural network can identify a set of most similar valid feature patches (e.g., from outside the designated portion of the low-resolution image result) for each corresponding generated feature patch within the designated portion of the low-resolution image result. For instance, the set of most similar valid feature patches can be based on a measure similarity (e.g., using cosine similarity).

These sets of most similar valid feature patches can then be used by the high-resolution input neural network to apply information within the designated portion of the high-resolution image. For instance, this information can help the high-resolution input neural network maintain important feature information when upsampling the low-resolution image result to a high-resolution image result. In particular, the high-resolution input neural network can map information from the most similar valid feature patches identified in the low-resolution image result to corresponding feature patches in the high-resolution image. These corresponding feature patches in the high-resolution image can then be used to replace the feature patches within the designated portion of the high-resolution image. For instance, a second to last layer of the high-resolution input neural network can be used to construct high-resolution feature patches inside the designated portion of the high-resolution image using the set of most similar high-resolution feature patches from outside the designated portion. Advantageously, because the corresponding feature patches in the high-resolution image are from outside the designated portion of the high-resolution image, these feature patches are from a portion of the high-resolution image that did not undergo image inpainting. Such a reconstructed image can then be run through two additional convolutional layers. These two additional convolutional layers can be used to convert the feature map information of the reconstructed image into a RGB output image (e.g., high-resolution image result).

This high-resolution image result can be analyzed to determine any error in the image inpainting system. Such error can be determined using loss functions. For instance, loss between the high-resolution image result and a ground-truth image can be used to update the image inpainting system (e.g., the low-resolution result neural network and/or high-resolution input neural network). For example, L1 reconstruction loss and hinge adversarial loss with spectral normalization can be used.

The overall process of training the image inpainting system can be repeated for a sufficiently large number of cycles. For instance, training can continue until one or more adversarial network(s) can no longer differentiate between a generated inpainted image or a ground-truth image as real or fake. In some embodiments, training can continue until the error stops decreasing from iteration to iteration. In further embodiments, a predefined number of training iterations can be used to train the image inpainting system (e.g., 5000 iterations) before the system is validated for performance. Such a predefined number of training iterations can balance the tradeoff between time and computational resources used during training and the accuracy of the functioning network(s) of the system.

Upon completion of training, the trained image inpainting system can be used to perform guided upsampling during image inpainting. In this way, a user can input an image with a designated portion for image inpainting. In some embodiments, the trained image inpainting system can be used to downsample the image, perform image inpainting, and then upsample the image inpainting result using guided upsampling (e.g., by borrowing known high-resolution feature patches from the high-resolution input image based on patch similarities computed using the downsampled image inpainting result). In other embodiments, the trained image inpainting system can perform guided upsampling on a received image inpainting result (e.g., by borrowing known high-resolution feature patches from the high-resolution input image based on patch similarities computed using the downsampled image inpainting result).

Further, in some embodiments, the image inpainting system can be trained to enhance images using guided texture refinement applied to an image inpainting method. In such an embodiment, the image inpainting result used to identify valid feature patches can be the same resolution as the generate image inpainting result where the valid feature patches are applied during image reconstruction during upsampling.

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102*a* and 102*b* through 102*n*, network 104, and server(s) 108. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102*a* through 102*n* can be any type of computing device capable of being operated by a user. For example, in some implementations, user devices 102*a* through 102*n* are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image editing, such as, upsampling an image that has undergone inpainting on one or more regions. In some implementations, the application(s) comprises a web application, which can run in a web browser, and could be hosted at least partially on the server-side of environment 100. In addition, or instead, the application(s) can comprise a dedicated application, such as an application having image editing and/or processing functionality. For example, such an application can be configured to display images and/or allow the user to input or identify images for editing. In some cases, the application is integrated into the operating system (e.g., as a service). It is therefore contemplated herein that "application" be interpreted broadly. Example applications include Adobe® Photoshop®, LightRoom®, and the like.

In accordance with embodiments herein, application 110 can facilitate editing (e.g., upsampling and/or refinement) of an image. In particular, a user can select or input an image or picture for editing (e.g., remove stains, scratches, blurred regions, objects, etc.). An image and/or picture can be selected or input in any manner. The application may facilitate the access of one or more images stored on the user device 102*a* (e.g., in a photo library), and/or import images from remote devices 102*b*-102*n* and/or applications, such as from server 108. For example, a user may take a picture using a camera on a device, for example, user device 102*a*. As another example, a user may select a desired image from a repository, for example, stored in a data store accessible by a network or stored locally at the user device 102*a*. Based on the input image, the input image can undergo image inpainting using any number of techniques. In some embodiments, after inpainting, the image can undergo upsampling using techniques, some of which are further discussed below with reference to image inpainting system 204 of FIG. 2, and an upsampled image (e.g., without a hole) can be provided to the user via the user device 102*a*. In some embodiments, such editing can be performed on an image that as previously undergone inpainting on one or more regions.

In particular, a user can indicate a region or portion of an image for editing (e.g., using inpainting) using application 110. Such an indication can be based on a user action with the image (e.g., click, scribble, object selection, etc.). Based on the user indication, a hole (e.g., based on the indicated region or portion of the image) in the image can undergo image inpainting. Such image inpainting can be used to fill unknown pixels the hole with predicted pixels (e.g., replace pixel information). In some embodiments, once the hole is filled with the predicted pixels, the image can be upsampled to a higher resolution (e.g., 256 to 512). In other embodiments, once the hole is filled with the predicted pixels, texture in the image can be refined and/or enhanced.

The user device can communicate over a network 104 with a server 108 (e.g., a Software as a Service (SAAS) server), which provides a cloud-based and/or network-based image inpainting system 106. The image inpainting system may communicate with the user devices and corresponding user interface to facilitate providing an edited image to a user via the user device using, for example, application 110.

As described herein, server 108 can facilitate editing (e.g., upsampling and/or refinement) an image that has undergone inpainting on one or more regions via image inpainting system 106. Server 108 includes one or more processors, and one or more computer-readable media. The computer-readable media includes computer-readable instructions executable by the one or more processors. The instructions may optionally implement one or more components of image inpainting system 106, described in additional detail below. Server 108 is capable of enhancing images using editing such as upsampling and/or texture refinement. Such upsampling can include increasing the resolution of the image (e.g., to a higher resolution). Such refinement can include enhancing texture within the image.

For cloud-based implementations, the instructions on server 108 may implement one or more components of image inpainting system 106. Application 110 may be utilized by a user to interface with the functionality implemented on server(s) 108, such as image inpainting system 106. In some cases, application 110 comprises a web browser. In other cases, server 108 may not be required, as further discussed with reference to FIG. 1B.

Thus, it should be appreciated that image inpainting system 106 may be provided via multiple devices arranged in a distributed environment that collectively provide the functionality described herein. Additionally, other components not shown may also be included within the distributed environment. In addition, or instead, image inpainting system 106 can be integrated, at least partially, into a user device, such as user device 102*a*.

Figure 1B:
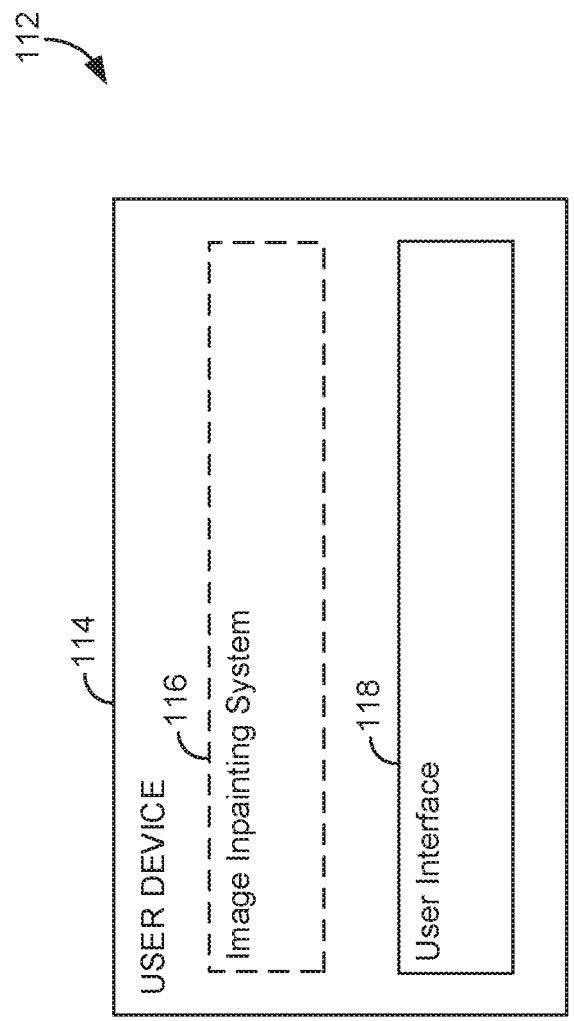
FIG. 1B depicts another example configuration of an operating environment in which some implementations of the present disclosure can be employed, in accordance with various embodiments.

Referring to FIG. 1B, aspects of an illustrative image inpainting system are shown, in accordance with various embodiments of the present disclosure. FIG. 1B depicts a user device 114, in accordance with an example embodiment, configured to facilitate editing (e.g., upsampling and/or refinement) an image that has undergone inpainting on one or more regions. The user device 114 may be the same or similar to the user device 102*a*-102*n* and may be configured to support the image inpainting system 116 (as a standalone or networked device). For example, the user device 114 may store and execute software/instructions to facilitate interactions between a user and the image inpainting system 116 via the user interface 118 of the user device.

A user device can be utilized by a user to edit an image using image inpainting. In particular, a user can select or input an image or picture for editing utilizing user interface 118. An image and/or picture can be selected or input in any manner. The user interface may facilitate the user accessing one or more images stored on the user device (e.g., in a photo library), and/or import images from remote devices and/or applications. Based on the input image, a portion or region of the input image can be selected for editing using inpainting. This inpainting can be performed using any number of techniques. In some embodiments, after inpainting, the image can undergo upsampling using techniques, some of which are further discussed below with reference to image inpainting system 204 of FIG. 2, and an upsampled image (e.g., without a hole) can be provided to the user via a user interface. In other embodiments, after inpainting, the image can undergo refinement using techniques, some of which are further discussed below with reference to image inpainting system 204 of FIG. 2, and a refined image (e.g., without a hole) can be provided to the user via a user interface.

Figure 2:
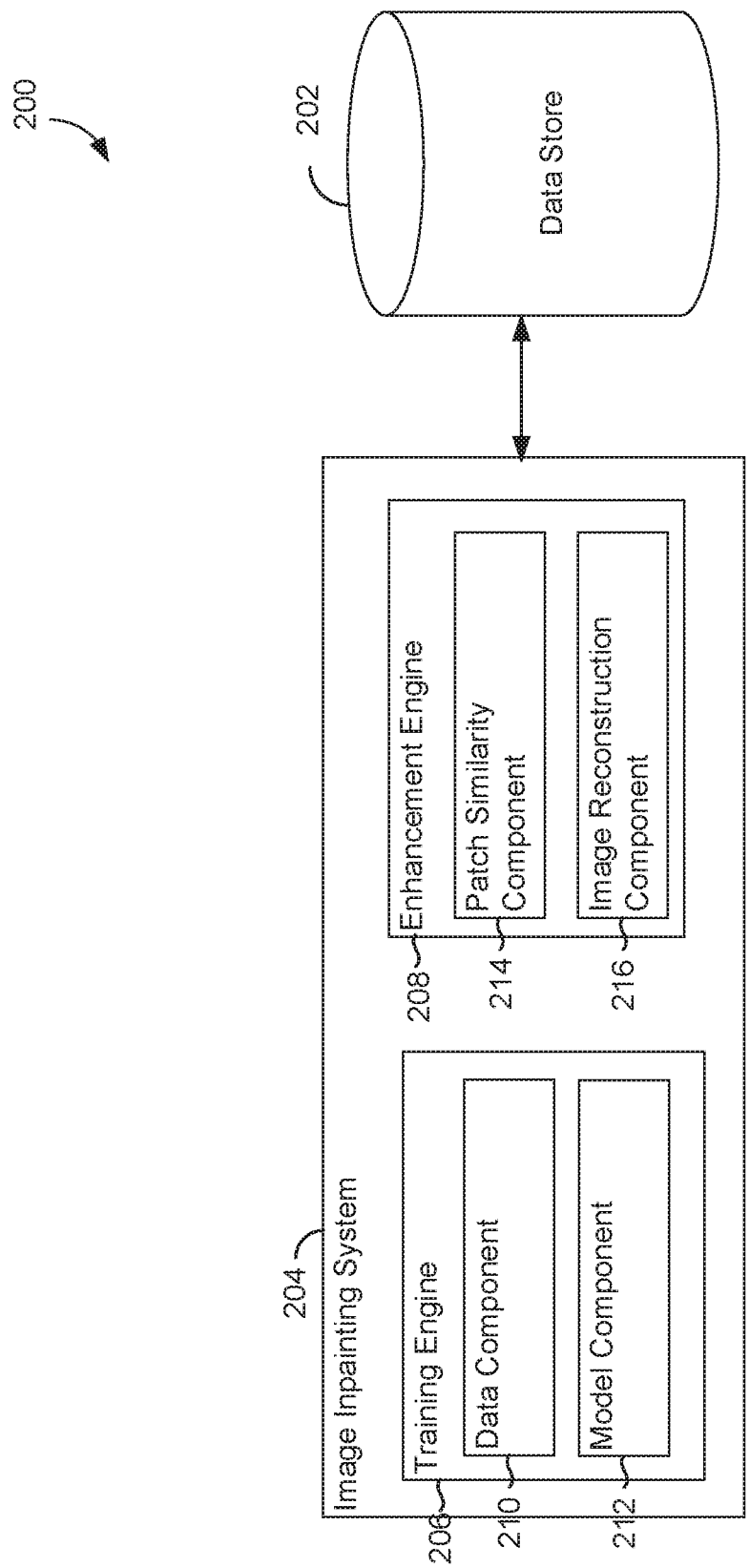
FIG. 2 depicts a further example configuration of an operating environment in which some implementations of the present disclosure can be employed, in accordance with various embodiments of the present disclosure.

Referring to FIG. 2, aspects of an illustrative image editing environment 200 are shown, in accordance with various embodiments of the present disclosure. Image inpainting system 204 includes training engine 206 and image editing engine 208. The foregoing engines of image inpainting system 204 can be implemented, for example, in operating environment 100 of FIG. 1A and/or operating environment 112 of FIG. 1B. In particular, those engines may be integrated into any suitable combination of user devices 102*a* and 102*b* through 102*n* and server(s) 108 and/or user device 114. While training engine and image editing engine are depicted as separate engines, it should be appreciated that a single engine could perform the functionality of one or more of the engines. Additionally, in implementations, the functionality of the engines can be performed using additional engines.

Such an image inpainting system can work in conjunction with data store 202. Data store 202 can store computer instructions (e.g., software program instructions, routines, or services), data, and/or models used in embodiments described herein. In some implementations, data store 202 can store information or data received via the various engines and/or components of image inpainting system 204 and provides the various engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data store 202 can be used to store one or more neural networks capable of being used to edit an image. In some embodiments, the one or more neural network can be trained to enhance an image using upsampling. In other embodiments, the one or more neural networks can be trained to enhance texture in an image. Such image enhancement (e.g., upsampling and/or refinement) can be applied to an image that has undergone inpainting on one or more regions. Such image enhancement can be based on deep learning techniques, further discussed below with reference to training engine 206 and enhancement engine 208.

In embodiments, data stored in data store 202 can include images a user can select for enhancing using, for example, the image inpainting system. An image can include a visual representation of a person, object, or scene. Examples of an image can include digital versions of a picture, painting, drawing, and/or photograph. Such images can be input into data store 202 from a remote device, such as from a server or a user device (e.g., MIT's Places2 dataset and a salient object segmentation dataset).

Data stored in data store 202 can also include training data. Such training data can comprise any type of data used to train one or more neural networks related to the image inpainting system. For instance, training data can include synthesized training samples with realistic holes and/or synthesized training samples using a mix of random strokes.

Image inpainting system 204 can generally be used for enhancing images that have undergone inpainting in one or more regions. Specifically, the image inpainting system can be configured for upsampling an image. As used herein, image inpainting is the process of filling a hole in an image (e.g., replacing undefined pixel values with determined pixel values). Additionally, image upsampling is the process of increasing the resolution of an image. In particular, the image inpainting system can train and/or use machine learning models to upsample an image that has undergone inpainting in one or more regions. Further, the image inpainting system can be configured for refining and/or enhancing texture of an image.

In accordance with embodiments described herein, the image inpainting system can be run using, for example, one or more networks based on a generative adversarial architecture. For example, the image inpainting system can be comprised of a low-resolution result neural network (e.g., comprised of an encoder and a decoder) and a low-resolution input neural network (e.g., comprised of an encoder and a decoder).

The low-resolution result neural network, for example, can receive a low-resolution image (e.g., that has undergone inpainting). This low-resolution image can be a down-sampled version of a high-resolution image that a user has input into the image inpainting system. The low-resolution result neural network can analyze feature patches of the low-resolution image for similarity. Low-resolution feature patches can generally be any size of pixels (e.g., 8×8). In particular, the low-resolution result neural network can analyze features of patches within a designated portion of an image. This designated portion can correspond to a hole that was filled using image inpainting. Further, the low-resolution result neural network can analyze features of patches outside of the designated portion of the image. The low-resolution result neural network can then perform a similarity analysis of the analyzed feature patches within the designated portion with the analyzed feature patches outside of the designated portion. From this similarity analysis, the low-resolution result neural network can identify similar feature patches outside of the designated portion for a feature patch within the designated portion. In some embodiments, additional information can be used to guide this similarity analysis. For example, a user can designate one or more areas to either avoid or specifically use when identifying similar feature patches.

The high-resolution input neural network, for example, can receive a high-resolution image (e.g., that corresponds to a low-resolution image that has undergone inpainting). Such a high-resolution image can have a designated portion that corresponds to the designated portion in the low-resolution image. In the high-resolution image, this designated portion can be blurry compared to the image outside of the designated portion. This blurry designated portion in the high-resolution image can result from upsampling the designated portion from the low-resolution image after filling the designated portion using inpainting. The high-resolution input neural network can map the low-resolution identified similar feature patches to corresponding low-resolution identified similar feature patches. Such mapping can be performed by scaling the coordinates of the feature patches in the low-resolution image to the coordinates of feature patches in the high-resolution image. High-resolution feature patches can generally be any size of pixels (e.g., 16×16). The high-resolution input neural network can apply the corresponding high-resolution feature patches when decoding the high-resolution image. For example, in a second to last layer (e.g., feature layer) of the high-resolution input neural network, feature patches inside the designated portion of the high-resolution image can be constructed using identified high-resolution feature patches from outside the designated portion.

In some embodiments, such as during training, the image inpainting system can further comprise an additional adversarial network related to adversarial training (e.g., a discriminator with spectral normalization). For instance, the adversarial network can receive the inpainted image or a ground-truth image and output a classification for each feature patch of the input image as real or fake. Such a classification can be a score map where each element corresponds to a local region of the input image covered by its receptive field.

Training engine 206 can be used to train aspects of the image inpainting system. For instance, training engine 206 can be used to generate data for use in training the image inpainting system. For instance, the data can comprise synthesized training samples with realistic holes and/or synthesized training samples using a mix of random strokes.

In addition, training engine 206 can be used to train the one or more networks of the image inpainting system. For instance, the image inpainting system can be comprised of a low-resolution result neural network (e.g., comprised of an encoder and a decoder) and a high-resolution input neural network (e.g., comprised of an encoder and a decoder). The low-resolution result neural network can be a shallow network that can used to calculate similarity between image feature patches. The high-resolution input neural network can be a shallow network with skip connections from each layer of the encoder to the corresponding layer of the decoder. Such a high-resolution input neural network can be used to upsample a low-resolution image result to a high-resolution image result using high-resolution valid feature patches mapped from low-resolution similar feature patches identified using the low-resolution result neural network. During training, the image inpainting system can further comprise at least one adversarial network.

As shown, training engine 206 can include data component 210 and model component 212. The foregoing components of training engine 206 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while the data component and the model component are depicted as different components, in implementations, the functionality of the components can be performed using a single component and/or one or more additional components.

Generally, data component 210 can be configured to generate data for use in training the image inpainting system. In one embodiments, such data can comprise synthesized training samples with realistic holes and/or synthesized training samples using a mix of random strokes. In particular, the data component can be used to synthesize training samples with realistic holes. For example, objects masks can be obtained from one or more datasets. Such datasets can include densely annotated segmentation datasets, including, for example, video segmentation, semantic segmentation, salient object segmentation, and/or human parsing. The object masks obtained from such datasets can be related to various subject matters and have different shapes and sizes.

Further, the data component can be used to synthesize training samples using a mix of random strokes in addition to the object masks as holes. Adding random strokes to the training dataset can create a more diverse training dataset that can overcome biases in image inpainting system towards object shaped holes.

To access an image to generate a training sample, the image can be accessed or referenced by data component 210. In this regard, the data component 210 may access or retrieve an image via data store 202 and/or from a remote device, such as from a server or a user device. As another example, the data component 210 may receive an image provided to the image inpainting system 204 via a user device. In some embodiments, data component 210 can be used to obtain previously generated training samples. Such training samples can be generated, for instance, using any number of training data generation techniques.

Upon obtaining training data (e.g., using data component 210), model component 212 can be utilized train one or more machine learning models to perform image inpainting along with guided upsampling of the image inpainting result. For instance, a designated portion in an image can be filled using image inpainting. Subsequently, the image inpainting result can undergo guided upsampling. In this way, the guided upsampling of an image inpainting result can generate a high-resolution image result where the filled pixels of the high-resolution image result appear realistic and semantically plausible in relation to the initial high-resolution input image.

In embodiments, the model component 212 can be used to train one or networks that are more neural based on a generative adversarial architecture. For instance, the model component 212 can train a low-resolution result neural network and a high-resolution input neural network, along with an adversarial neural network. The low-resolution result neural network can be comprised of an encoder and a decoder. The high-resolution input neural network can be comprised of an encoder and a decoder. The adversarial neural network can be comprised of a discriminator with spectral normalization. Training can be implemented using, for example, Python and Pytorch. In addition, an Adam optimizer can be used. A learning rate can be set to 0.0001 and a batch size set to 64. To prevent the model from ignoring scarce samples, an equal number of samples can be sampled from any datasets used (e.g., Places2 dataset and a saliency dataset) for each batch. In some embodiments, the model used by the image inpainting system can be trained to upsample 256×256 results to 512×512.

Initially, to train the one or more neural networks of the image inpainting system, the low-resolution result neural network can receive a low-resolution image (e.g., an image with a hole that has been filled using inpainting). This low-resolution image can be a downsampled version of a high-resolution image that a user has input into the image inpainting system for image inpainting. The low-resolution image can be used to analyze feature patches of the low-resolution image for similarity. Generally, a feature patch can be a group of pixels. For example, a feature patch related to the low-resolution image can be an 8×8 group of pixels.

In particular, the low-resolution result neural network can be used to analyze features of patches within a designated portion of an image. This designated portion can correspond to a hole that was filled using image inpainting. Further, the low-resolution result neural network can analyze features of patches outside of the designated portion of the image. In this way, the low-resolution result neural network can perform a similarity analysis of the analyzed feature patches within the designated portion with the analyzed feature patches outside of the designated portion. For instance, the low-resolution result neural network can calculate a cosine similarity (e.g., $s_{ij}$) between a generated feature patch i (e.g., a feature patch within the designated portion of the image) and a valid feature patch j (e.g., feature patch outside the designated portion of the image). In some embodiments, a valid feature patch can be a feature patch with at least one pixel outside of the designated portion of the image. Using this similarity analysis, the low-resolution result neural network can identify a set of valid feature patches for a corresponding generated feature patch.

To further train the one or more neural networks of the image inpainting system, the high-resolution input neural network can receive a high-resolution image (e.g., that corresponds to a low-resolution image received by the low-resolution result neural network). This high-resolution image can have a designated portion that corresponds to the designated portion in the low-resolution image. In particular, in the high-resolution image, the designated portion can be blurry compared to the image outside of the designated portion. This designated portion in the high-resolution image can be blurry because the area can result from upsampling the designated portion from the low-resolution image after filling the designated portion in the low-resolution area using inpainting.

The high-resolution input neural network can also receive the set of valid feature patches identified by the low-resolution result neural network. As the high-resolution input neural network encodes and decodes the high-resolution image, in a feature map layer of the network (e.g., the second to last layer of the network), the high-resolution input neural network can apply the set of valid feature patches. In particular, the features of patches inside the designated portion can be constructed using a weighted sum of the set of valid feature patches. For instance, H can be used to denote a set of feature patches within the designated portion of the high-resolution image. In addition, V can be used to denote the set of valid feature patches. Further, $\varphi_j$ can be used to denote a feature of a valid feature patch j outside of the designated portion and $\varphi_i$ can be used to denote a feature of a patch i inside of the designated portion. A representative equation can be:

$$\varphi_i = \sum_{j \in V} s'_{ij} \varphi_j$$

In such an equation, $s'_{ij}$ can be the softmax of $s_{ij}$. A representative equation of softmax of $s_{ij}$ can be:

$$s'_{ij} = \frac{\exp(s_{ij})}{\sum_{j \in V} \exp(s_{ij})}$$

The feature map (e.g., reconstructed image), including feature patches from inside and outside of the designated portion can be transformed into an output image using two final convolutional layers of the high-resolution input neural network.

During training, the image inpainting system can further comprise an adversarial network related to adversarial training (e.g., a discriminator with spectral normalization). For instance, the adversarial network can receive the inpainted image or a ground-truth image and output a classification for each patch of the input image as real or fake. Such a classification can be a score map where each element corresponds to a local region of the input image covered by its receptive field.

During training, the image inpainting system can be updated for errors. In particular, the low-resolution result neural network and high-resolution input neural network can be updated. Adjusting the low-resolution result neural network and high-resolution input neural network to correct for errors can be accomplished by changing at least one node parameter. The low-resolution result neural network and high-resolution input neural network can each comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Errors can be determined, for example, using loss functions. For instance, a PatchGAN discriminator with spectral normalization of the adversarial neural network can be used for adversarial training. Loss on the output image from the high-resolution input neural network can be L1 loss combined with adversarial loss. Such adversarial loss can be hinge adversarial loss with spectral normalization. The feature patches with at least one valid pixel can be set as valid feature patches. For missing regions reconstructed using these partially valid feature patches, they can be used as designated portions (e.g., holes) and run using a pre-trained inpainting model.

Further, the image inpainting system can undergo validation. In particular, a number of image can be randomly taken from the training split of the Places2 dataset and a saliency dataset for use as validation samples. The model can be trained until a peak signal-to-noise on the validation set does not increase.

Enhancement engine 208 can be used to implement one or more trained neural networks as part of the image inpainting system. For instance, enhancement engine 208 can implement the image inpainting system using the trained low-resolution result neural network (e.g., comprised of an encoder and a decoder) and the trained fine low-resolution input neural network (e.g., comprised of an encoder and a decoder). Enhancement engine 208 can be used to process low-resolution image results (e.g., low-resolution images that have undergone inpainting). Such processing can include image enhancement. In some embodiments, this enhancement can be upsampling of the low-resolution image result to a high-resolution output image (e.g., high-resolution image result).

As shown, the enhancement engine 208 can include patch similarity component 214 and image reconstruction component 216. The foregoing components of enhancement engine 208 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while the patch similarity component and the image reconstruction component are depicted as separate components, in implementations, the functionality of the engine can be performed using a single component and/or additional components.

Generally, patch similarity component 214 can be configured to perform patch similarity analysis. In particular, patch similarity component 214 can be used to analyze feature patches within a designated portion of a low-resolution image result that has undergone image inpainting. These feature patches can generally be low-resolution feature patches of any size of pixels (e.g., 8×8). In an embodiment, such an analysis can be performed using, for example, one or more neural networks. For example, the trained low-resolution result neural network (e.g., comprised of an encoder and a decoder) can be used to analyze the feature patches.

Patch similarity component 214 can receive a low-resolution image result. This low-resolution image result can be generated from a downsampled version of a high-resolution image input into the image inpainting system for image inpainting. In particular, the image inpainting system can downsample the input high-resolution image to generate a low-resolution image. This low-resolution image can then undergo image inpainting using any number of techniques. Upon completion of image inpainting on the low-resolution image, a low-resolution image result can be output. Such a low-resolution image result can be received by the patch similarity component 214 for similarity analysis.

Patch similarity component 214 can perform similarity analysis by analyzing feature patches. In particular, patch similarity component 214 can use the trained low-resolution result neural network to analyze features of patches within a designated portion of the low-resolution image result. This designated portion can correspond to a hole that was filled using image inpainting. The low-resolution result neural network can also analyze features of patches outside of the designated portion of the image. In this way, feature patches within the designated portion can be compared with feature patches outside of the designated portion. For instance, the low-resolution result neural network can calculate a level of similarity (e.g., using cosine similarity) between a generated feature patch (e.g., a feature patch within the designated portion of the low-resolution image result) and a valid feature patch (e.g., feature patch outside the designated portion of the low-resolution image result). In some embodiments, a valid feature patch can be a feature patch with at least one pixel outside of the designated portion of the low-resolution image result. Using this similarity analysis, the low-resolution result neural network can identify a most similar feature patch for each corresponding generated patch within the designated portion of the low-resolution image result.

In some embodiments patch similarity component 214 can incorporate user control in the similarity analysis. In particular, a user can designate one or more areas to either avoid or specifically use when identifying similar feature patches. For example, a user can designate an area in an image (e.g., the high-resolution image input into the image inpainting system for image inpainting) that should be avoided (e.g., avoid area) during the similarity analysis. During the similarity analysis, any valid feature patches that includes one or more pixels within the avoid area can be discarded by the system during the similarity analysis. For instance, the low-resolution result neural network will not select a feature patch as the most similar feature patch if one or more pixels in the feature patch are from within the avoid area. A user can designate such an avoid area using a user action with the image (e.g., click, scribble, object selection, etc.). Based on the user action, the avoid area can be avoided during the similarity analysis. Such an avoid area can be depicted, using for example, a red color on an image.

As another example, a user can designate an area in an image (e.g., the high-resolution image input into the image inpainting system for image inpainting) that should favored (e.g., encourage area) during the similarity analysis. During the similarity analysis, valid feature patches that includes one or more pixels that are not within the encourage area can be discarded by the system during the similarity analysis. For instance, the low-resolution result neural network will not select a feature patch as the most similar feature patch if one or more pixels in the feature patch are not within the encourage area. A user can designate such an encourage area using a user action with the image (e.g., click, scribble, object selection, etc.). Based on the user action, the encourage area can be favored during the similarity analysis. Such an encourage area can be depicted, using for example, a green color on an image.

Generally, image reconstruction component 216 can be configured to perform image enhancement. In particular, image reconstruction component 216 can be used to upsample a low-resolution image result (e.g., that relates to a high-resolution input image) that has undergone image inpainting. Such upsampling can increase the resolution of the low-resolution image result (e.g., upsample 256×256 to 512×512).

Image reconstruction component 216 can receive the high-resolution image input into the image inpainting system for image inpainting. This high-resolution image can have a designated portion for image inpainting (e.g., a hole to be filled). In particular, in embodiments, the high-resolution image can comprise a designated portion (e.g., that corresponds to the designated portion in the low-resolution image result filled using image inpainting) that has been filled using upsampled pixels from the low-resolution image result.

Image reconstruction component 216 can perform image reconstruction by incorporating most similar feature patches (e.g., identified using patch similarity component 214) into the high-resolution image. In particular, image reconstruction component 216 can use the trained high-resolution input neural network to apply information within the designated portion of the high-resolution image. Such information can correspond to the most similar feature patches. For instance, the high-resolution input neural network can map information from the most similar feature patches identified in the low-resolution image result to corresponding feature patches in the high-resolution image. Such high-resolution feature patches can generally be any size of pixels (e.g., 16×16).

For instance, image reconstruction component 216 can receive the set of most similar feature patches identified by the low-resolution result neural network. The high-resolution input neural network can apply the corresponding high-resolution feature patches when decoding the high-resolution image. For example, in a second to last layer (e.g., feature layer) of the high-resolution input neural network, features of patches inside the designated portion of the high-resolution image can be constructed using the set of most similar high-resolution feature patches from outside the designated portion.

Figure 3:
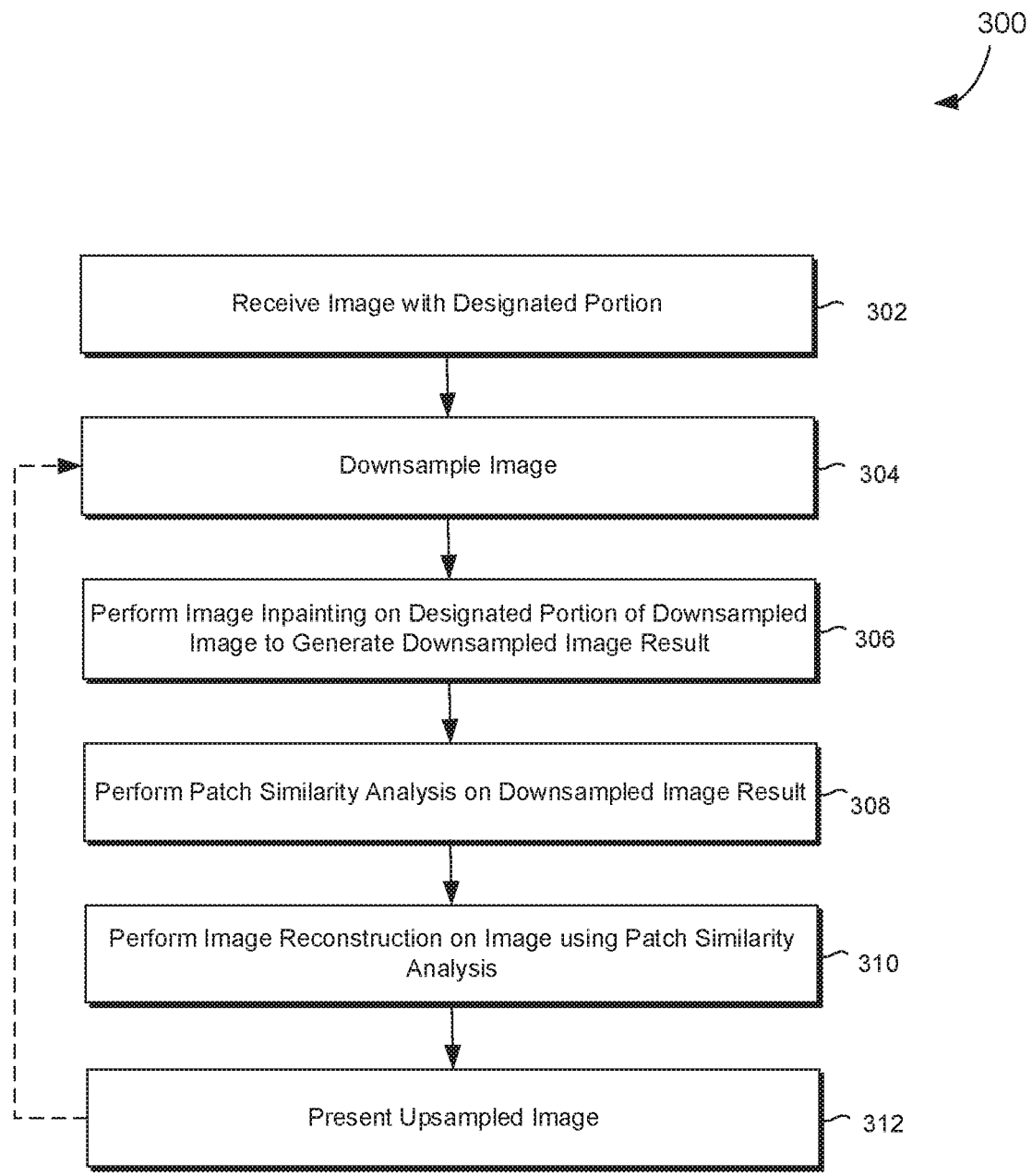
FIG. 3 depicts a process flow showing an embodiment of a method for performing enhanced image inpainting, in accordance with embodiments of the present disclosure.

With reference to FIG. 3, a process flow is provided showing an embodiment of method 300 for performing enhanced image inpainting, in accordance with embodiments of the present disclosure. Method 300 can be performed, for example by image inpainting system 204, as illustrated in FIG. 2.

At block 302, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device. In embodiments, the image can be a high-resolution image (e.g., 512×512)

The received image can have a designated portion. The designated portion of the image can be one or more regions in the image comprising undefined pixels where information for those respective pixels is not known (e.g., holes). In some embodiments, these one or more regions can be identified by a user. For instance, a user can indicate a region or portion of an image for editing (e.g., inpainting). Such an indication can be based on a user action with the image (e.g., click, scribble, object selection, etc.).

At block 304, the image is downsampled. In particular, the image can be downsampled to a lower resolution. For example, a 512×512 image can be downsampled to 256×256. Such downsampling can be performed using any number of downsampling techniques. At block 306, image inpainting is performed on the downsampled image to generate a downsampled image result (e.g., the downsampled image with the designated portion filled using inpainting). For instance, image inpainting can be performed on the designated portion of the downsampled image to determine pixel information to update the undefined pixels in the designated portion. Such image inpainting can be performed using any number of inpainting techniques.

At block 308, patch similarity analysis is performed on the downsampled image result. The patch similarity analysis can be performed using a low-resolution result neural network to analyze features of patches within the designated portion of the low-resolution image result. This designated portion can correspond to a hole that was filled using image inpainting. The low-resolution result neural network can also analyze features of patches outside of the designated portion of the image. In this way, feature patches within the designated portion can be compared with feature outside of the designated portion. For instance, the low-resolution result neural network can calculate a level of similarity (e.g., using cosine similarity) between a generated feature patch (e.g., a feature patch within the designated portion of the low-resolution image result) and a valid feature patch (e.g., a feature patch outside the designated portion of the low-resolution image result). In some embodiments, a valid feature patch can be a feature patch with at least one pixel outside of the designated portion of the low-resolution image result. Using this similarity analysis, the low-resolution result neural network can identify a most similar feature patch for each corresponding generated feature patch within the designated portion of the low-resolution image result.

At block 310, image reconstruction is performed on the image. In particular, information based on the patch similarity analysis can be used for image reconstruction. For example, a high-resolution input neural network can apply information within the designated portion of the high-resolution image. Such information can correspond to the most similar feature patches. For instance, the high-resolution input neural network can map information from the most similar feature patches identified in the low-resolution image result to corresponding feature patches in the high-resolution image. These corresponding feature patches in the high-resolution image can then be used to replace the feature patches within the designated portion of the high-resolution image. For instance, in a second to last layer of the high-resolution input neural network features of patches inside the designated portion of the high-resolution image can be constructed using the set of most similar high-resolution feature patches from outside the designated portion.

At block 312, an upsampled image is output. This upsampled image is a high-resolution image result. In particular, the upsampled image can be generated using the reconstructed image (e.g., from block 310) that is constructed using high-resolution feature patches inside the designated portion of the high-resolution image. To generate the upsampled image, such a reconstructed image can be run through additional convolutional layers. These additional convolutional layers can be used to convert the feature map information of the reconstructed image into a RGB output image (e.g., high-resolution image result). This output upsampled image can be presented. Presentation of the output image allows a user to see and visualize the generated image that has undergone guided upsampling after image inpainting.

Figure 4:
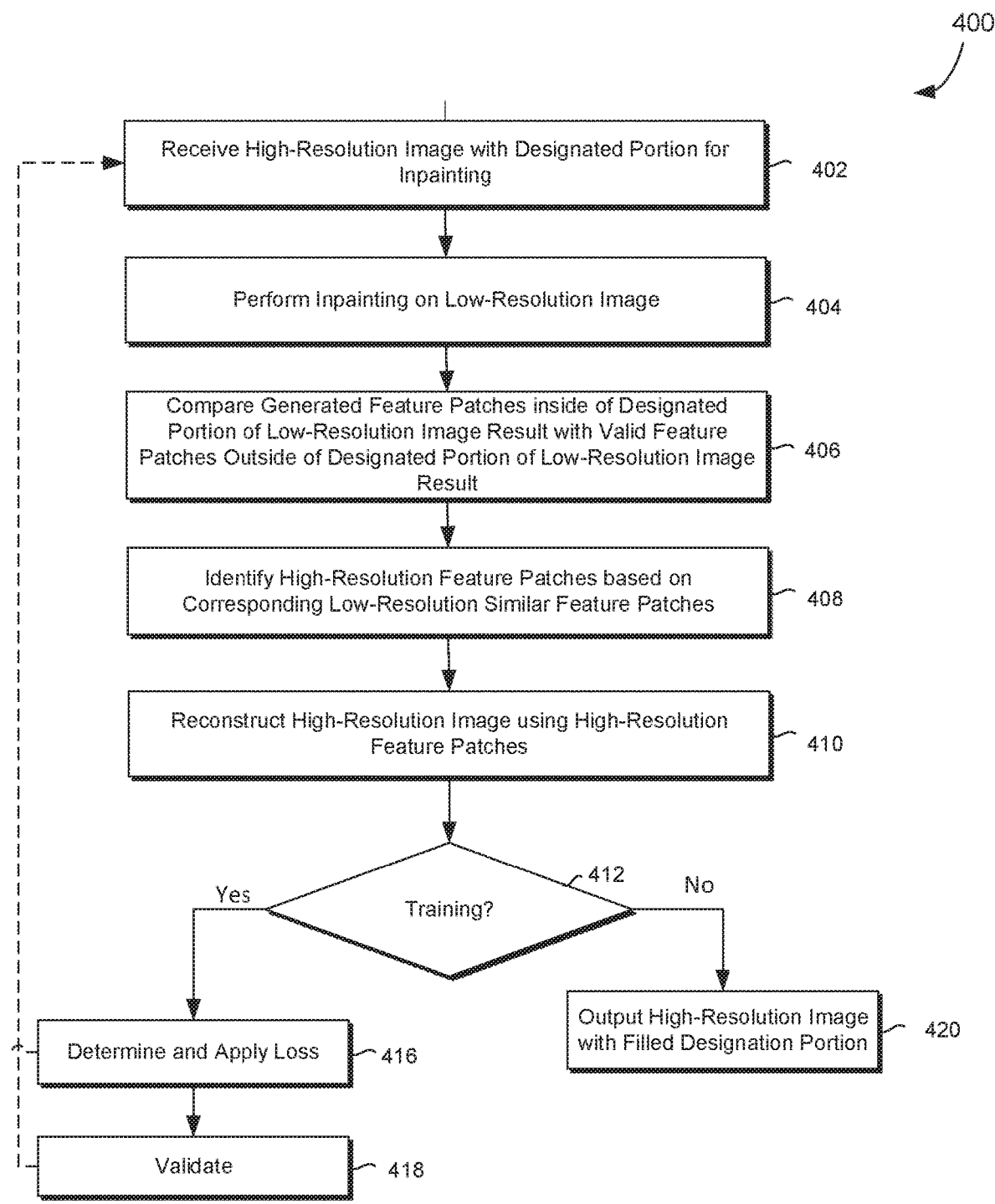
FIG. 4 depicts a process flow showing an embodiment of a method for training and/or using an image inpainting system to perform upsampling of image inpainting results, in accordance with embodiments of the present disclosure.

With reference to FIG. 4, a process flow is provided showing an embodiment of method 400 for training and/or using an image inpainting system to perform upsampling of image inpainting results, in accordance with embodiments of the present disclosure. Method 400 can be performed, for example by image inpainting system 204, as illustrated in FIG. 2.

At block 402, a high-resolution image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

The high-resolution image can have a designated portion for image inpainting. The designated portion of the high-resolution image can be one or more regions in the image comprising undefined pixels where information for those respective pixels is not known (e.g., holes). For example, this designated portion can be one or more regions in the image designated for editing to remove stains, scratches, blurred regions, objects, etc. In this way, pixel information in the one or more regions can be removed (e.g., for filling using pixel information determined during image inpainting). In some embodiments, these one or more regions can be identified by a user. For instance, a user can indicate a region or portion of the image for editing (e.g., iterative inpainting). Such an indication can be based on a user action with the image (e.g., click, scribble, object selection, etc.).

At block 404, inpainting is performed on a low-resolution image. The low-resolution image can be the high-resolution image downsampled to a lower resolution (e.g., 512×512 to 256×256). Image inpainting can be performed on the low-resolution image to generate a low-resolution image result (e.g., the low-resolution image with the designated portion filled using inpainting). For instance, image inpainting can be performed on the designated portion of the low-resolution image to determine pixel information used to update the undefined pixels in the designated portion. Such image inpainting can be performed using any number of inpainting techniques.

At block 406, generated feature patches from inside the designated portion of the low-resolution image are compared with valid feature patches that are outside of the designated portion of the low-resolution image. This comparison can be performed using a patch similarity analysis. For instance, features of patches within the designated portion of the low-resolution image result can be compared with features of patches outside of the designated portion of the image. A level of similarity (e.g., using cosine similarity) between a generated feature patch (e.g., a feature patch within the designated portion of the low-resolution image result) and a valid feature patch (e.g., a feature patch outside the designated portion of the low-resolution image result) can be determined. In embodiments, a most similar feature patch can be determined for each corresponding generated feature patch within the designated portion of the low-resolution image result using this similarity analysis. In some embodiments, for example during training, a set of most similar feature patch can be determined for each corresponding generated patch within the designated portion of the low-resolution image result using this similarity analysis.

At block 408, one or more high-resolution feature patches are identified based on corresponding low-resolution similar feature patches. For instance, high-resolution feature patches can be identified by mapping information from the most similar feature patches identified in the low-resolution image result to corresponding feature patches in the high-resolution image. This mapping can be performed by scaling x-y coordinates in the low-resolution image result to the high-resolution image.

At block 410, a high-resolution image is reconstructed using the high-resolution feature patches. In particular, information from the high-resolution feature patches can be used to replace pixel information within the designated portion of the high-resolution image. In an embodiment, this replacement can be performed in a second to last layer of a high-resolution input neural network where features from patches inside the designated portion of the high-resolution image can be constructed using the high-resolution feature patches from outside the designated portion.

At block 412, when the image inpainting system is undergoing training, the process proceeds to block 414. At block 414, loss is determined and applied. In particular, loss can be based on an output enhanced high-resolution image. Such loss can be L1 loss combined with adversarial loss. This adversarial loss can be hinge adversarial loss with spectral normalization. Upon determining this loss, the image inpainting system can be updated using the loss. The process of blocks 402-416 can be repeated for a number of iterations.

After completing a number of training iterations, at block 418, validation is performed. Validation can be used to evaluate the machine learning model trained to perform enhanced image inpainting (e.g., using a low-resolution result neural network and a high-resolution input neural network). In particular, validation can be used to evaluate the accuracy of the trained system. Training and validation can continue to occur until validation indicates that the performance of the system is not improving based on additional training.

Returning to block 412, when the image inpainting system is not undergoing training, the process proceeds to block 420. At block 420, a high-resolution image with a filled designation portion is output. This output high-resolution image is a high-resolution image result generated by the image inpainting system. In particular, the high-resolution image can be generated using the reconstructed high-resolution image (e.g., from block 410) that is constructed using high-resolution feature patches inside the designated portion of the high-resolution image. To generate the high-resolution image, such a reconstructed high-resolution image can be run through convolutional layers. These convolutional layers can be used to convert the feature map information of the reconstructed high-resolution image into a RGB output high-resolution image. This output high-resolution image can be presented. Presentation of the output high-resolution image allows a user to see and visualize the generated image that has undergone guided upsampling after image inpainting.

Figure 5:
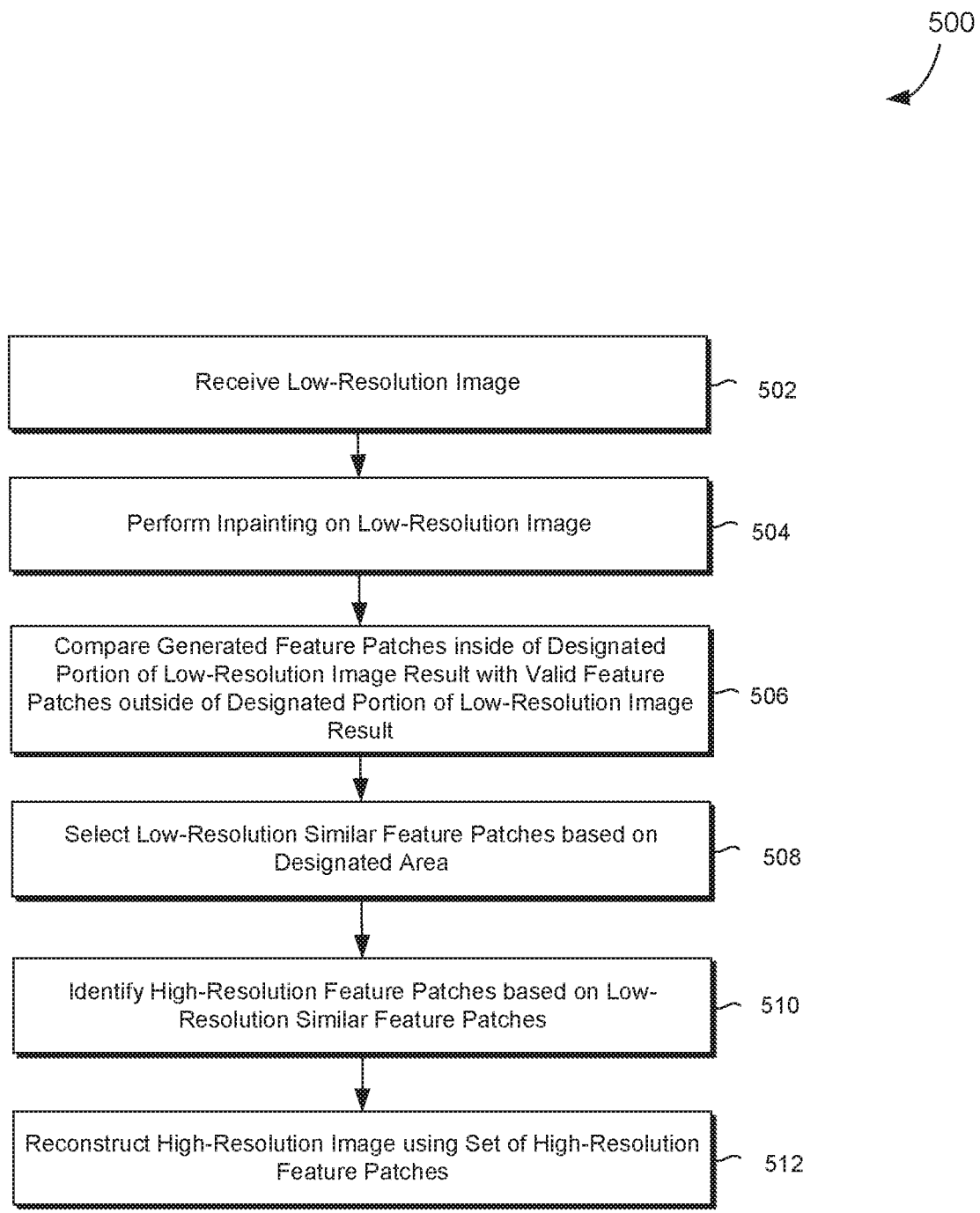
FIG. 5 depicts a process flow showing an embodiment of a method for using an image inpainting system to perform guided upsampling of image inpainting results, in accordance with embodiments of the present disclosure.

With reference to FIG. 5, a process flow is provided showing an embodiment of method 400 for using an image inpainting system to perform guided upsampling of image inpainting results, in accordance with embodiments of the present disclosure. Method 500 can be performed, for example by image inpainting system 204, as illustrated in FIG. 2.

At block 502, a low-resolution image is received. The low-resolution image can be a high-resolution image input into the image inpainting system downsampled to a lower resolution (e.g., 512×512 to 256×256). Such a high-resolution image can have a designated portion for image inpainting. In some embodiments, the designated portion can be identified by a user. For instance, a user can indicate a region or portion of the image for editing (e.g., using iterative inpainting). Such an indication can be based on a user action with the image (e.g., click, scribble, object selection, etc.).

At block 504, inpainting is performed on a low-resolution image. Image inpainting can be performed on the low-resolution image to generate a low-resolution image result (e.g., the low-resolution image with the designated portion filled using inpainting). For instance, image inpainting can be performed on the designated portion of the low-resolution image to determine pixel information to update the undefined pixels in the designated portion. Such image inpainting can be performed using any number of inpainting techniques.

At block 506, generated feature patches from inside the designated portion of the low-resolution image are compared with valid feature patches that are outside of the designated portion of the low-resolution image. This comparison can be performed using a patch similarity analysis. For instance, features of patches within the designated portion of the low-resolution image result can be compared with features of patches outside of the designated portion of the image. A level of similarity (e.g., using cosine similarity) between a generated feature patch (e.g., a feature patch within the designated portion of the low-resolution image result) and a valid feature patch (e.g., a feature patch outside the designated portion of the low-resolution image result) can be determined. In embodiments, a most similar feature patch can be determined for each corresponding generated feature patch within the designated portion of the low-resolution image result using this similarity analysis. In some embodiments, for example during training, a set of most similar feature patches can be determined for each corresponding generated feature patch within the designated portion of the low-resolution image result using this similarity analysis.

At block 508, low-resolution feature patches are selected based on a designated area. This designated area can incorporate user control in the similarity analysis. In particular, a user can designate one or more areas to either avoid or specifically use when identifying similar feature patches. For example, a user can designate an area in an image should be avoided (e.g., avoid area) during the similarity analysis. During the similarity analysis, any valid feature patches that include one or more pixels within the avoid area can be discarded during the similarity analysis. A user can designate such an avoid area using a user action with the image (e.g., click, scribble, object selection, etc.). Based on the user action, the avoid area can be avoided during the similarity analysis. Such an avoid area can be depicted, using for example, a red color on an image. As another example, a user can designate an area in an image that should favored (e.g., encourage area) during the similarity analysis. During the similarity analysis, valid feature patches that include one or more pixels that are not within the encourage area can be discarded during the similarity analysis. A user can designate such an encourage area using a user action with the image (e.g., click, scribble, object selection, etc.). Based on the user action, the encourage area can be favored during the similarity analysis. Such an encourage area can be depicted, using for example, a green color on an image.

At block 510, high-resolution feature patches are identified based on corresponding low-resolution similar feature patches. For instance, high-resolution feature patches can be identified by mapping information from the most similar feature patches identified in the low-resolution image result to corresponding feature patches in the high-resolution image. This mapping can be performed by scaling x-y coordinates in the low-resolution image result to the high-resolution image.

At block 512, a high-resolution image is reconstructed using a set of high-resolution feature patches. In particular, information from the set of high-resolution feature patches (e.g., identified at block 510) can be used to replace pixel information within the designated portion of the high-resolution image. In an embodiment, this replacement can be performed in a second to last layer of a high-resolution input neural network where features from patches inside the designated portion of the high-resolution image can be constructed using the high-resolution patches from outside the designated portion. When a set of most similar feature patches is determined, information related to the set of most similar feature patches can be averaged for use during image reconstruction. Such averaged information can be used in embodiments related to training of the image inpainting system.

Figure 6:
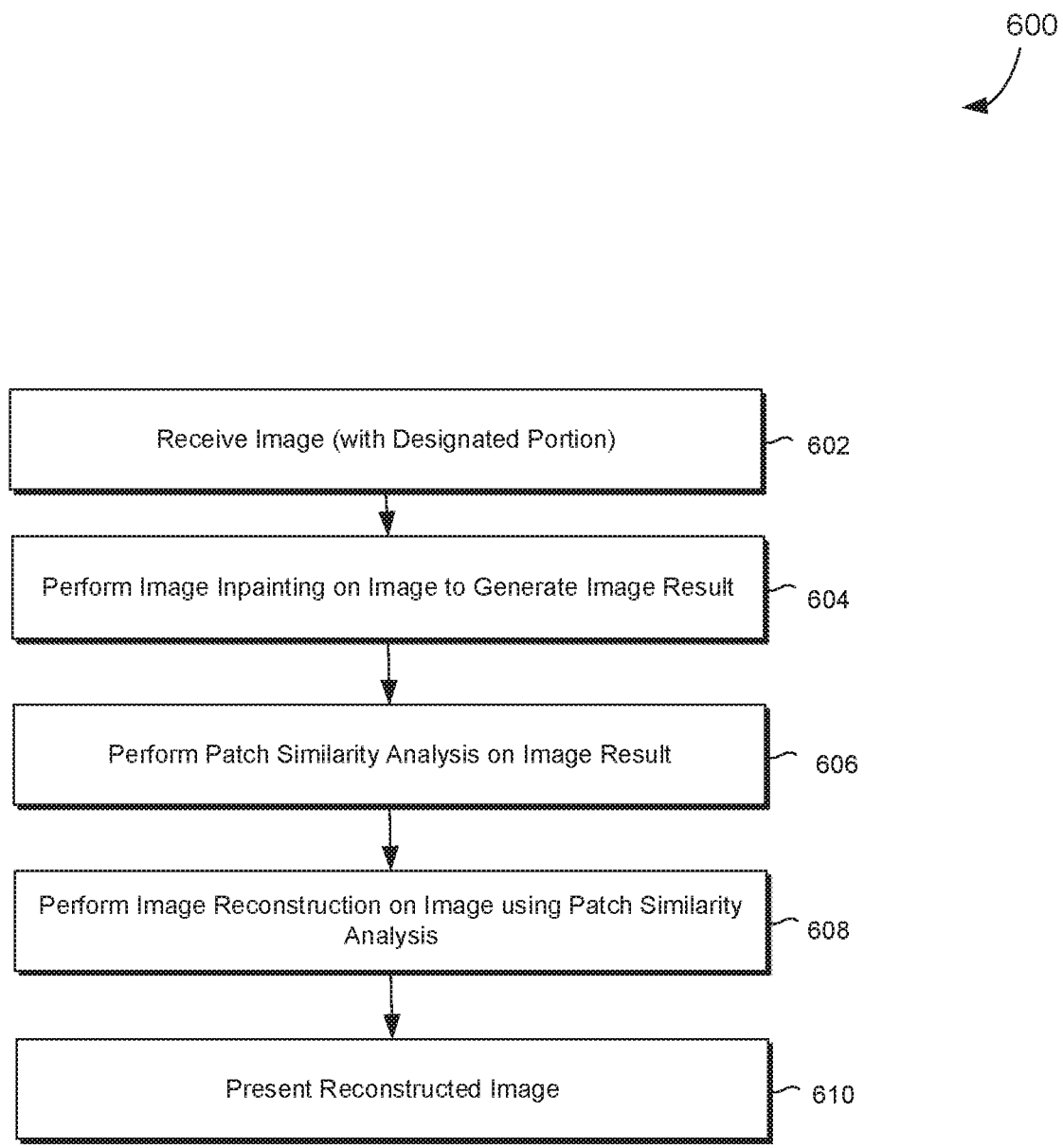
FIG. 6 depicts a process flow showing an embodiment of a method for using an image inpainting system to perform image enhancement of image inpainting results, in accordance with embodiments of the present disclosure.

With reference to FIG. 6, a process flow is provided showing an embodiment of method 600 for using an image inpainting system to perform image enhancement of image inpainting results, in accordance with embodiments of the present disclosure. Method 600 can be performed, for example by image inpainting system 204, as illustrated in FIG. 2.

At block 602, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

The image can have a designated portion for image inpainting. The designated portion of the image can be one or more regions in the image comprising undefined pixels where information for those respective pixels is not known (e.g., holes). In some embodiments, these one or more regions can be identified by a user. For instance, a user can indicate a region or portion of the image for editing (e.g., iterative inpainting). Such an indication can be based on a user action with the image (e.g., click, scribble, object selection, etc.).

At block 604, inpainting is performed on the image. For instance, image inpainting can be performed on the designated portion of the image to determine pixel information to update the undefined pixels in the designated portion. Such image inpainting can be performed using any number of inpainting techniques.

At block 606, patch similarity analysis is performed on the image result. The patch similarity analysis can be performed using a trained neural network to analyze features of patches within the designated portion of the image result. This designated portion can correspond to a hole that was filled using image inpainting. The trained neural network can also analyze features of patches outside of the designated portion of the image. In this way, feature patches within the designated portion can be compared with feature patches outside of the designated portion. For instance, the trained neural network can calculate a level of similarity (e.g., using cosine similarity) between a generated feature patch (e.g., a patch within the designated portion of the image result) and a valid feature patch (e.g., patch outside the designated portion of the image result). In some embodiments, a valid feature patch can be a patch with at least one pixel outside of the designated portion of the image result. Using this similarity analysis, the trained neural network can identify a most similar feature patch for each corresponding generated feature patch within the designated portion of the image result.

At block 406, image reconstruction is performed on the image using information from the patch similarity analysis. Image reconstruction can be performed on the image using valid feature patches to replace generated feature patches. In particular, information from the valid feature patches can be used to update pixels within the designated portion of the image. In an embodiment, this replacement can be performed in a second to last layer of a trained input neural network where features from patches inside the designated portion of the image can be constructed using the valid feature patches from outside the designated portion. In some embodiments, this replacement of pixel information can increase the resolution of the image. In other embodiments, this replacement of pixel information can enhance texture of the image.

Figure 7:
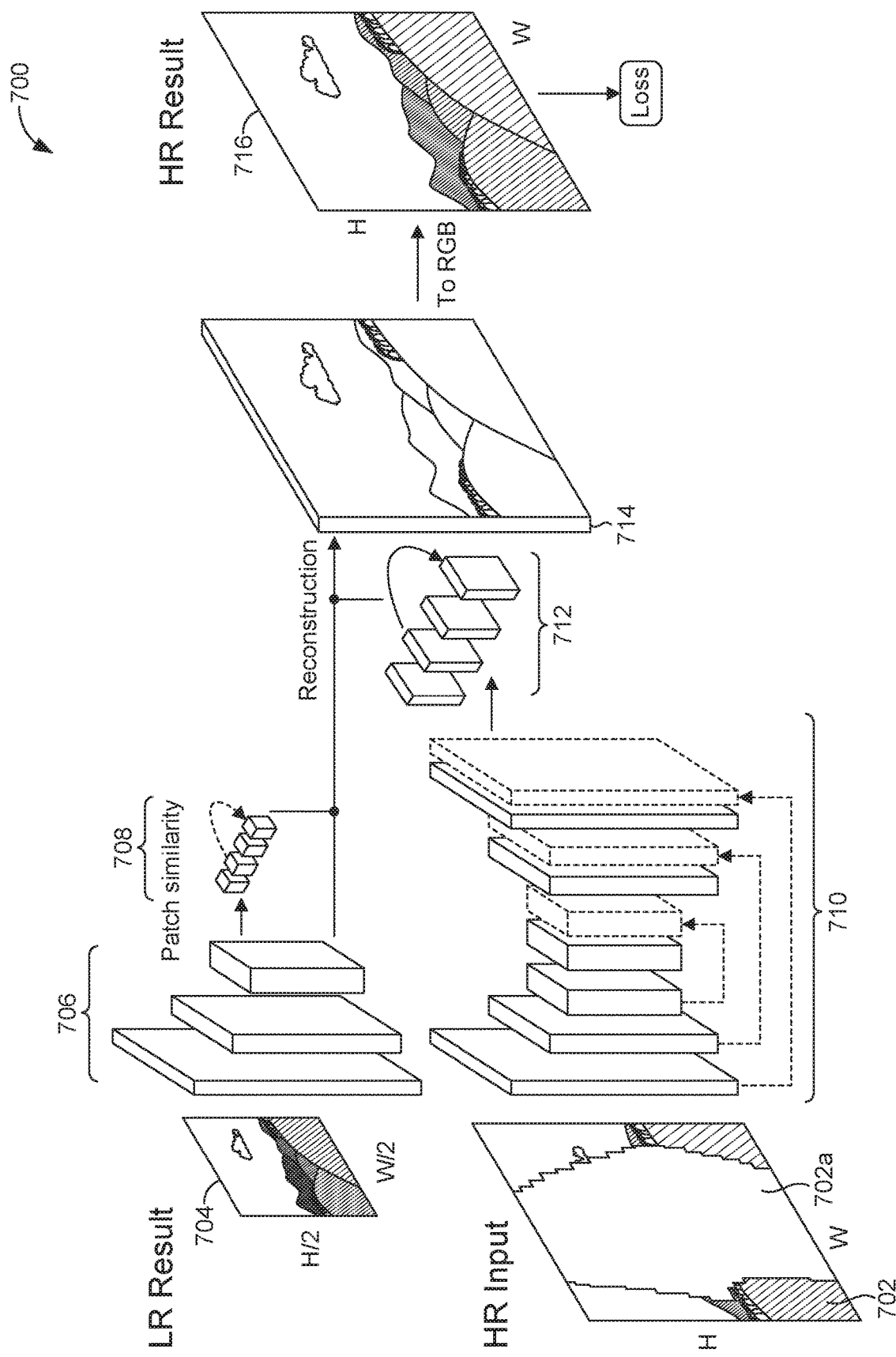
FIG. 7 depicts an example architecture used for training and/or using an image inpainting system used for post-processing image enhancement related to image inpainting, in accordance with various embodiments of the present disclosure.

FIG. 7 illustrates an example environment 700 that can be used for post-processing image enhancement related to image inpainting, in accordance with embodiments of the present disclosure. In particular, one or more networks based on a generative adversarial architecture can be used to enhance inpainting results. For example, a generator of the image inpainting system can be comprised of two shallow networks, one for learning patch similarity (e.g., a low-resolution result neural network) and one for image reconstruction (e.g., a high-resolution input neural network). The low-resolution result neural network can be used to analyze features of patches within a designated portion of an image. For instance, the low-resolution result neural network can calculate similarity (e.g., a cosine similarity) between a generated feature patch (e.g., a feature patch within the designated portion of the image) and a valid feature patch (e.g., feature patch outside the designated portion of the image). The high-resolution input neural network can receive a high-resolution image (e.g., that corresponds to a low-resolution image received by the low-resolution result neural network). The high-resolution input neural network can also receive the set of valid feature patches identified by the low-resolution result neural network. The high-resolution input neural network can generate a high-resolution image is reconstructed using a set of high-resolution feature patches that correspond to the set of valid feature patches identified by the low-resolution result neural network.

Input image 702 can be received for image inpainting. Such an image can be received from a group of images or pictures stored in a database, such as data store 202 of FIG. 2. In particular, a user can select or input the received image. Such an image can be selected or input in any manner. For example, a user may take a picture using a camera on a device. As another example, an image can be selected from a repository, for example, stored in a data store accessible by a network or stored locally at a user device. For instance, such an image can be automatically selected. In other embodiments, such an image can be selected by a user. In embodiments, such an image can be a high-resolution image (e.g., 512×512).

Initially, when input into environment 700, input image 702 can have corresponding designated portion 702*a*. Designated portion 702*a* can be indicate a hole comprising undefined pixels in image 702. Designated portion 702*a* can indicate one or more portion, region, and/or object in input image 702 where inpainting is to be performed. Designated portion 702*a* can be selected or input in any manner. For example, a user may designate one or more portion, region, and/or object in the image. Such a designated portion can correspond to an object to remove, a scratch or blur to correct, and/or any other editing that can be performed using image inpainting.

Image result 704 can be a low-resolution image result. Image result 704 can be a downsampled version of input image 702 that has undergone image inpainting (e.g., to fill designated portion 702*a*).

Image result 704 can be input into low-resolution result neural network 706. Low-resolution result neural network 706 can have an encoder-decoder structure. From image result 704, low-resolution result neural network 706 can analyze feature patches of image result 704 for similarity. For instance, low-resolution result neural network 706 can perform patch similarity analysis 708. During patch similarity analysis 708, similarity can be analyzed between valid feature patches of image result 704 (e.g., feature patches outside a designated portion that corresponds to designated portion 702*a*) and generated feature patches of image result 704 (e.g., feature patches inside a designated portion that corresponds to designated portion 702*a*). In some embodiments, a cosine similarity can be used during patch similarity analysis 708.

When input image 702 is being processed by high-resolution input neural network 710, designated portion 702*a* can comprise upsampled pixels from low-resolution image result 704. For instance, input image 702 can be input into high-resolution input neural network 710. High-resolution input neural network 710 can be used to perform image reconstruction 712. During image reconstruction, 712 high-resolution feature patches can be identified based on corresponding low-resolution similar feature patches identified by low-resolution result neural network 706 during similarity analysis 708. For instance, high-resolution feature patches can be identified by mapping information from the feature patches identified by low-resolution result neural network 706 to corresponding feature patches in input image 702. This mapping can be performed by scaling x-y coordinates in image result 704 to input image 702.

In addition, during image reconstruction 712 information from the high-resolution feature patches can be used to replace pixel information for pixels within designated portion 702*a* of input image 702. In an embodiment, this replacement can be performed in a second to last layer of high-resolution input neural network 710. In this second to last layer, features from patches inside designated portion 702*a* of input image 702 can be reconstructed during decoding using information from high-resolution feature patches from outside designated portion 702*a*. From image reconstruction 712, reconstructed image 714 can be generated. Reconstructed image 714 can comprise a feature map including original pixels (e.g., outside of designated portion 702*a*) and replaced pixels (e.g., from the high-resolution feature patches used to replace pixels within designated portion 702*a*). Reconstructed image 714 can then be run through two additional convolutional layers. These two additional convolutional layers can be used to convert the feature map information into a RGB output image (e.g., high-resolution image result 716).

In some embodiments, such as during training, an adversarial network can be used as a discriminator to analyze high-resolution image result 716. For instance, the adversarial network, can receive high-resolution image result 716 or a ground-truth image and output a classification for each patch of the input image as real or fake. Such a classification can be a score map where each element corresponds to a local region of an input image covered by its receptive field.

During training, high-resolution image result 716 can also be analyzed to determine any error in the image inpainting system. For example, loss based on high-resolution image result 716 can be used to update low-resolution result neural network 706 and/or high-resolution input neural network 710. For instance, L1 reconstruction loss and hinge adversarial loss with spectral normalization can be used.

Figure 8A:
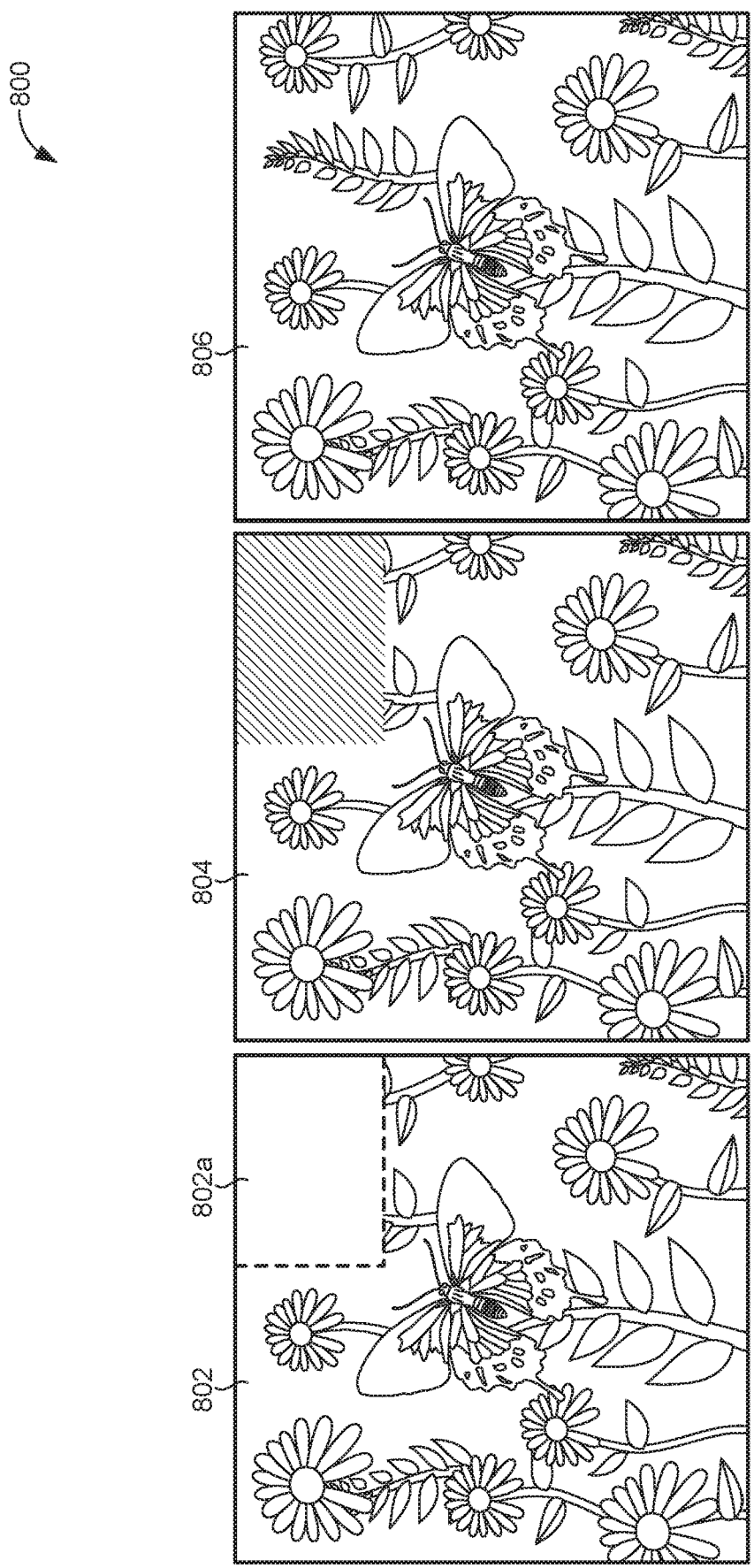
FIGS. 8A-8B illustrate example enhanced image inpainting results, in accordance with embodiments of the present disclosure.
Figure 8B:
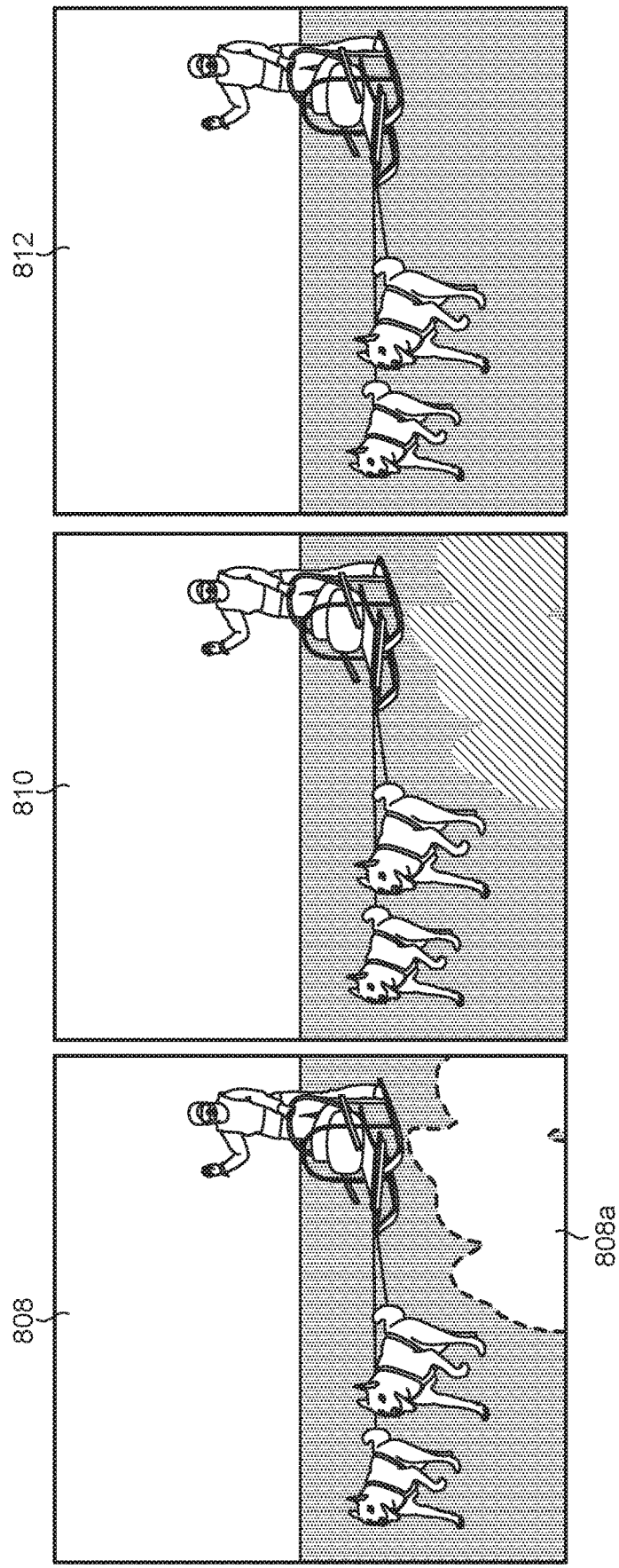

FIGS. 8A-8B illustrate example enhanced image inpainting results, in accordance with embodiments of the present disclosure. FIG. 8A is an illustrative example of image 802 undergoing image enhancement. Image 802 can be a high-resolution image (e.g., 512×512). Image 802 can include hole 802a. Image 804 is an example of image 802 undergoing image inpainting without enhancement. Image 806 is an example of image 802 undergoing image inpainting with enhancement, in accordance with embodiments of the present disclosure.

For instance, image 802 can be input into an image inpainting system. To generate image, 806, the image inpainting system can perform inpainting on image 802 downsampled to half the resolution of image 802. The image result from inpainting on this downsampled image can then be analyzed using techniques of the present disclosure. In particular, a low-resolution result neural network can be used to analyze features of patches within a designated portion (e.g., corresponding to hole 802a) of the image result. A high-resolution input neural network can then take image 802 and a set of valid feature patches identified by the low-resolution result neural network to generate image 806. Noticeably, image 806 has a filled hole 802a that more closely resembles the background of the rest of image 802.

FIG. 8B is an illustrative example of image 808 undergoing image enhancement. Image 808 can be a high-resolution image (e.g., 512×512). Image 808 can include hole 808a. Image 810 is an example of image 808 undergoing image inpainting without enhancement. Image 812 is an example of image 808 undergoing image inpainting with enhancement, in accordance with embodiments of the present disclosure.

For instance, image 808 can be input into an image inpainting system. To generate image, 812, the image inpainting system can perform inpainting on image 808 downsampled to half the resolution of image 808. The image result from inpainting on this downsampled image can then be analyzed using techniques of the present disclosure. In particular, a low-resolution result neural network can be used to analyze features of patches within a designated portion (e.g., corresponding to hole 808a) of the image result. A high-resolution input neural network can then take image 808 and a set of valid feature patches identified by the low-resolution result neural network to generate image 812. Noticeably, image 812 has a filled hole 808a that more closely resembles the background (e.g., snow texture) of the rest of image 808.

Figure 9B:
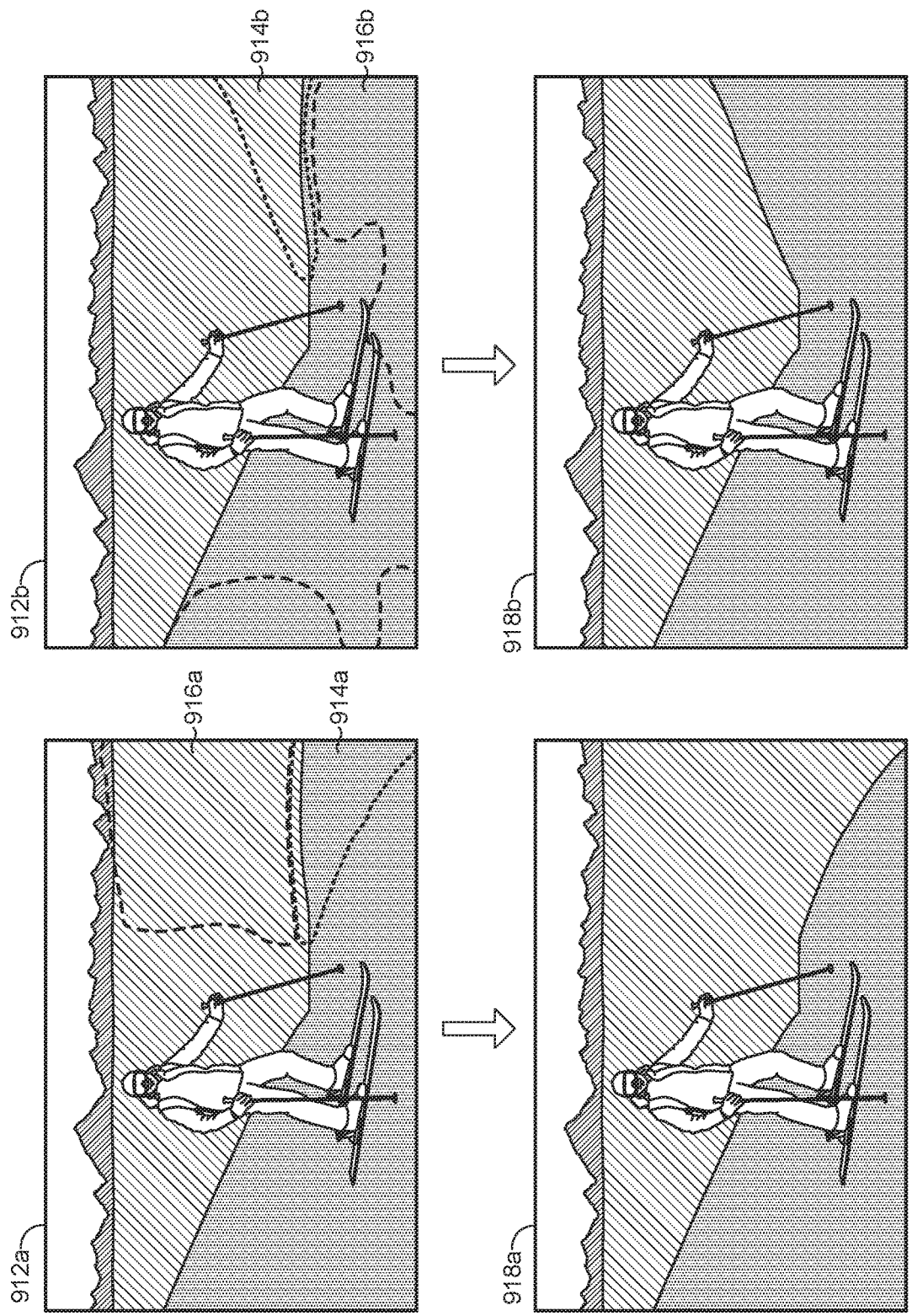

FIGS. 9A-9B illustrate examples of enhanced image inpainting results using an image inpainting system to perform image enhancement using guided upsampling, in accordance with embodiments of the present disclosure. For instance, in FIG. 9A, image 902a can be input into an image inpainting system along with designated portion 904 for image inpainting. Image 906 can be an enhanced image inpainting result using an image inpainting system to perform image enhancement using upsampling without guidance. As can be visualized in the expanded portion of image 906, remnants of leaves have been used to fill what should be a grassy area. Image 910, on the other hand has been generated using an image inpainting system to perform image enhancement using guided upsampling. In particular, image 902b can be input into an image inpainting system with designated portion 904 for image inpainting as well as avoid area 908. An avoid area can be an area that should be avoided during a similarity analysis used to determine valid feature patches to replace generated feature patches inside designated portion 904. For instance, during the similarity analysis, any valid feature patches that include one or more pixels within avoid area 908 can be discarded during the similarity analysis. For instance, a low-resolution result neural network will not select a feature patch as the most similar feature patch if one or more pixels in the feature patch are from within the avoid area.

A user can designate such an avoid area using a user action with the image (e.g., click, scribble, object selection, etc.). Based on the user action, the avoid area can be avoided during the similarity analysis. Such an avoid area can be depicted, using for example, a red color on an image. In embodiments, the avoid area can be depicted using any number of colors.

As can be visualized in the expanded portion of image 910, using guided upsampling based on avoid area 908 results in the area of image 906 with remnants of leaves instead being filled to match the grassy area.

In FIG. 9B, image 912a can be input into an image inpainting system along with designated portion 914a for image inpainting. Image 918 can be an enhanced image inpainting result using an image inpainting system to perform image enhancement using guided upsampling based on an encourage area. An encourage area can be a user designated area in an image that should be favored during similarity analysis. As can be visualized in image 918a, the background in the distance has been designated as encourage area 916a. Using this encourage area 916a, during the similarity analysis, results in image 918a having designated portion 914a filled using feature patches from encourage area 916a. In particular, image 918a has designated portion 914a filled using feature patches from the background in the distance of the image.

Image 918b, on the other hand, has been generated using an image inpainting system to perform image enhancement using guided upsampling based on a different encourage area. In particular, image 912b can be input into an image inpainting system with designated portion 914b for image inpainting as well as encourage area 916b. As can be visualized in image 918b, the snow in the foreground has been designated as encourage area 916b. Using this encourage area 916b, during the similarity analysis, results in image 918b having designated portion 914b filled using feature patches from encourage area 916b. In particular, image 918b has designated portion 914b filled using feature patches from the snow in the foreground of the image.

A user can designate such an encourage area using a user action with the image (e.g., click, scribble, object selection, etc.). Based on the user action, the avoid area can be favored during the similarity analysis. Such an encourage area can be depicted, using for example, a green color on an image. In embodiments, the encourage area can be depicted using any number of colors.

Figure 10:
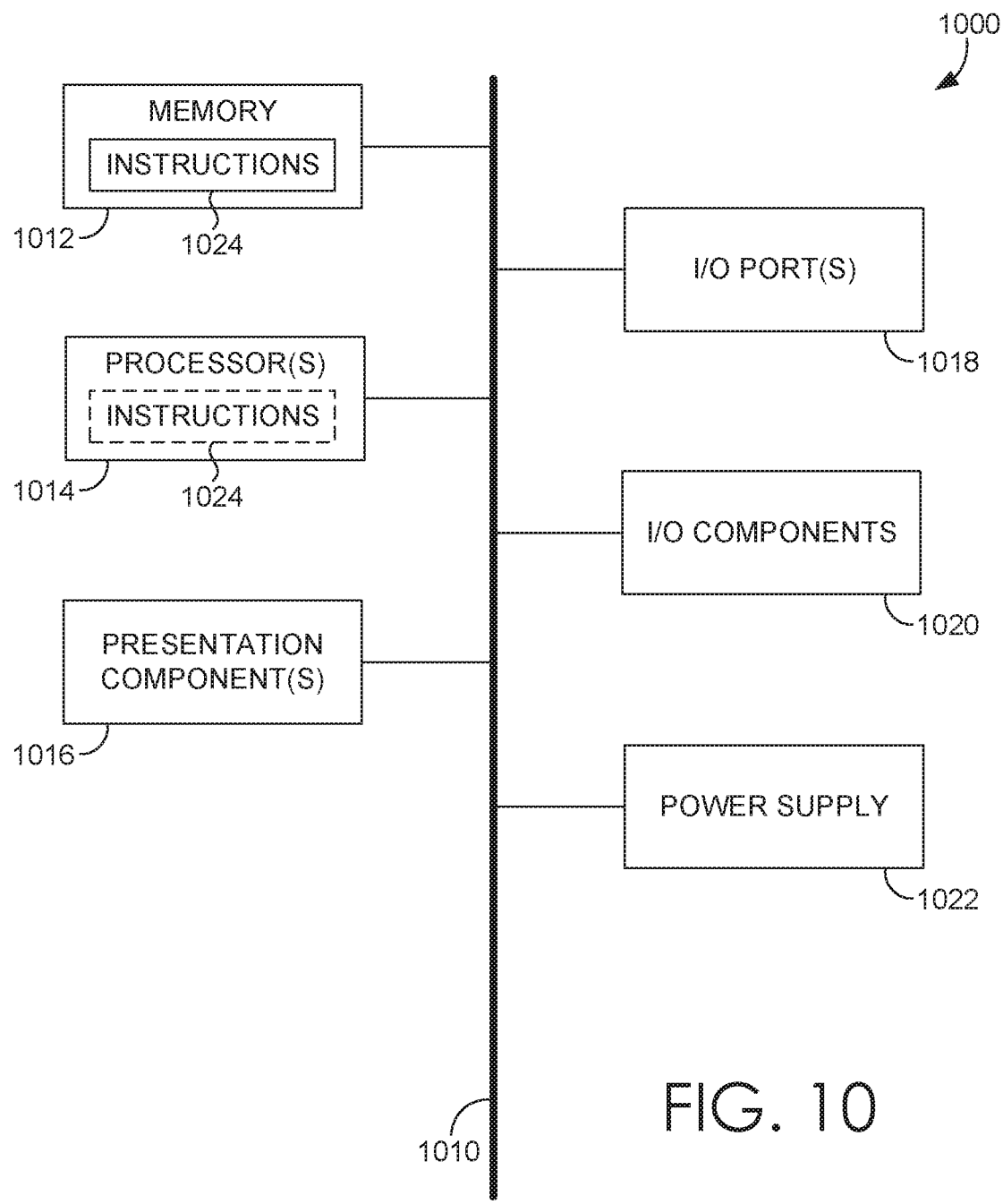
FIG. 10 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 10, an illustrative operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory Computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

Having thus described the invention, what is claimed is:

1. A computer-implemented method, the method comprising:
    obtaining a low-resolution inpainting result comprising valid feature patches outside of a designated portion of the inpainting result and generated feature patches inside of the designated portion, the generated feature patches determined using the low-resolution image inpainting;
    performing, via a low-resolution result neural network that analyzes feature patches of low-resolution inpainting results, patch similarity analysis on feature patches of the low-resolution inpainting result, wherein the patch similarity analysis compares the valid feature patches with the generated feature patches;
    determining a most similar valid feature patch for a generated feature patch of the low-resolution inpainting result based on a measure of similarity;
    identifying a high-resolution feature patch in a higher-resolution input image, the higher-resolution feature patch being from outside a portion of the higher-resolution input image corresponding to the designated portion of the low-resolution inpainting result, wherein the high-resolution feature patch in the higher-resolution input image is identified by mapping, via a high-resolution input neural network, the most similar valid feature patch in the low-resolution inpainting result to the high-resolution feature patch in the higher-resolution input image, wherein the mapping is performed by scaling coordinates of the most similar valid feature patch to coordinates of the high-resolution feature patch, wherein the higher-resolution input image and the high-resolution feature patch having a higher resolution compared to the low-resolution inpainting result, the valid feature patches, and the generated feature patches;
    incorporating, via the high-resolution input neural network trained to upsample images, the high-resolution feature patch, that mapped to the most similar value feature patch in the low-resolution inpainting result, into the portion of the higher-resolution input image to provide upsampling image reconstruction of the low-resolution inpainting result by constructing the portion of the higher-resolution input image using information corresponding with the high-resolution feature patch that mapped to the most similar value feature patch in the low-resolution inpainting result, wherein the information is applied to the portion of the higher-resolution input image to maintain feature information when upsampling; and
    outputting a high-resolution inpainting result based on the upsampling image reconstruction, wherein the high-resolution inpainting result has a resolution higher than the inpainting result.

2. The method of claim 1, further comprising:
    downsampling the higher-resolution input image to generate a lower-resolution image; and
    performing image inpainting on the lower-resolution image to generate the low-resolution inpainting result.

3. The method of claim 1, wherein the patch similarity analysis compares the valid feature patches with the generated feature patches using cosine similarity.

4. The method of claim 1, further comprising:
    receiving a designated area to incorporate user control during the patch similarity analysis.

5. The method of claim 4, wherein the user control indicates an avoid area, the avoid area corresponding to an area in the low-resolution inpainting result to favor by discarding any valid feature patches from the patch similarity analysis that includes one or more pixels within the avoid area.

6. The method of claim 4, wherein the user control indicates an encourage area, the encourage area corresponding to an area in the low-resolution inpainting result to be favored by discarding any valid feature patches from the patch similarity analysis that includes one or more pixels outside the encourage area.

7. The method of claim 1, wherein the high-resolution input neural network is trained by:
    updating the high-resolution input neural network using a loss based on the high-resolution inpainting result and a ground-truth image.

8. One or more computer storage media storing computer-useable instructions that, when used by one or more computing devices, cause the one or more computing devices to perform operations comprising:
    obtaining a lower-resolution inpainting result generated using image inpainting;
    identifying a set of lower-resolution feature patches for corresponding feature patches generated during the image inpainting;
    incorporating, via a machine learning model, a set of higher-resolution feature patches into a portion of a higher-resolution input image to provide upsampling image reconstruction of the lower-resolution inpainting result, the set of higher-resolution feature patches corresponding to the set of lower-resolution feature patches based on the set of higher-resolution feature patches mapping to most similar value feature patches in the lower-resolution inpainting result by constructing the portion of the higher-resolution input image using information corresponding with the set of higher-resolution feature patches that mapped to the most similar value feature patches in the lower-resolution inpainting result, wherein the information is applied to the portion of the higher-resolution input image to maintain feature information when upsampling, wherein the lower-resolution inpainting result and the lower-resolution feature patches have lower resolution compared to the higher-resolution input image and the set of higher-resolution feature patches; and outputting a high-resolution inpainting result based on the incorporated set of higher-resolution feature patches, wherein the high-resolution inpainting result has a resolution higher than the inpainting result.

9. The one or more computer storage media of claim 8, the operations further comprising:

downsampling the higher-resolution input image to generate a lower-resolution image; and performing the image inpainting on the lower-resolution image to generate the lower-resolution inpainting result.

10. The one or more computer storage media of claim 8, wherein a patch similarity analysis is used to identify the set of lower-resolution feature patches by comparing valid feature patches outside of a designated portion with generated feature patches inside of the designated portion using cosine similarity.

11. The one or more computer storage media of claim 10, the operations further comprising:

receiving a designated area to incorporate user control during the patch similarity analysis.

12. The one or more computer storage media of claim 11, wherein the user control indicates an avoid area, the avoid area corresponding to an area in the lower-resolution inpainting result to favor by discarding any valid feature patches from the patch similarity analysis that includes one or more pixels within the avoid area.

13. The one or more computer storage media of claim 11, wherein the user control indicates an encourage area, the encourage area corresponding to an area in the lower-resolution inpainting result to be favored by discarding any valid feature patches from the patch similarity analysis that includes one or more pixels outside the encourage area.

14. The one or more computer storage media of claim 8, wherein the set of higher-resolution feature patches in the higher-resolution input image that correspond to the set of lower-resolution feature patches are determined by mapping coordinates of each of the set of lower-resolution feature patches to corresponding coordinates in the higher-resolution input image.

15. The one or more computer storage media of claim 8, wherein identifying the set of lower-resolution feature patches and incorporating the set of higher-resolution feature patches into the portion of the higher-resolution input image are performed using one or more trained neural networks.

16. A computing system comprising:

means for performing patch similarity analysis on feature patches of a low-resolution inpainting result, wherein the low-resolution inpainting result comprises valid feature patches outside of a designated portion of the low-resolution inpainting result and generated feature patches inside of the designated portion and the generated feature patches being determined using image inpainting and patch similarity analysis compares the valid feature patches with the generated feature patches;

means for identifying a high-resolution feature patch in a higher-resolution input image, the higher-resolution feature patch being from outside a portion of the higher-resolution input image corresponding to the designated portion of the low-resolution inpainting result, wherein the high-resolution feature patch in the higher-resolution input image is identified by mapping, via a high-resolution input neural network, a most similar valid feature patch in the low-resolution inpainting result to the high-resolution feature patch in the higher-resolution input image, wherein the mapping is performed by scaling coordinates of the most similar valid feature patch to coordinates of the high-resolution feature patch, wherein the higher-resolution input image and the high-resolution feature patch have a higher resolution compared to the low-resolution inpainting result, the valid feature patches, and the generated feature patches;

means for incorporating, via a machine learning model, the high-resolution feature patch, that mapped to the most similar valid feature patch in the low-resolution inpainting result, into the higher-resolution input image to provide upsampling image reconstruction of the low-resolution inpainting result.

17. The system of claim 16, further comprising:

means for performing image inpainting to generate the low-resolution inpainting result.

18. The system of claim 16, further comprising:

means for outputting a high-resolution inpainting result based on the upsampling image reconstruction, wherein the high-resolution inpainting result has a resolution higher than the inpainting result.

* * * * *